United States Patent
Prada Gomez et al.

(10) Patent No.: US 8,558,759 B1
(45) Date of Patent: Oct. 15, 2013

(54) HAND GESTURES TO SIGNIFY WHAT IS IMPORTANT

(75) Inventors: Luis Ricardo Prada Gomez, Hayward, CA (US); Aaron Wheeler, San Francisco, CA (US)

(73) Assignee: Google Inc., Mountain View, CA (US)

( * ) Notice: Subject to any disclaimer, the term of this patent is extended or adjusted under 35 U.S.C. 154(b) by 255 days.

(21) Appl. No.: 13/179,190

(22) Filed: Jul. 8, 2011

(51) Int. Cl.
G09G 5/00 (2006.01)

(52) U.S. Cl.
USPC ............................... 345/7; 345/156; 345/619

(58) Field of Classification Search
USPC ......... 345/7, 8, 156, 173, 418, 619, 620, 660, 345/661; 349/11, 13; 705/14.58; 359/630; 715/716, 764, 848; 351/158; 700/258, 700/259
See application file for complete search history.

(56) References Cited

U.S. PATENT DOCUMENTS

| | | | |
|---|---|---|---|
| 6,771,294 B1 * | 8/2004 | Pulli et al. ..................... 715/863 |
| 7,192,136 B2 | 3/2007 | Howell et al. |
| 7,255,437 B2 | 8/2007 | Howell et al. |
| 7,380,936 B2 | 6/2008 | Howell et al. |
| 7,401,918 B2 | 7/2008 | Howell et al. |
| 7,438,410 B1 | 10/2008 | Howell et al. |
| 7,481,531 B2 | 1/2009 | Howell et al. |
| 7,487,468 B2 * | 2/2009 | Tanaka et al. ................. 715/863 |
| 7,500,746 B1 | 3/2009 | Howell et al. |
| 7,500,747 B2 | 3/2009 | Howell et al. |
| 7,543,934 B2 | 6/2009 | Howell et al. |
| 7,581,833 B2 | 9/2009 | Howell et al. |
| 7,621,634 B2 | 11/2009 | Howell et al. |
| 7,716,606 B2 * | 5/2010 | Rekimoto ..................... 715/848 |
| 7,760,898 B2 | 7/2010 | Howell et al. |
| 7,771,046 B2 | 8/2010 | Howell et al. |
| 7,787,992 B2 | 8/2010 | Pretlove et al. |
| 7,792,552 B2 | 9/2010 | Thomas et al. |
| 7,806,525 B2 | 10/2010 | Howell et al. |
| 7,922,321 B2 | 4/2011 | Howell et al. |
| 7,928,926 B2 * | 4/2011 | Yamamoto et al. ............... 345/8 |
| 8,009,141 B1 * | 8/2011 | Chi et al. ....................... 345/156 |
| 8,085,243 B2 * | 12/2011 | Yamashita et al. ............ 345/158 |
| 8,109,629 B2 | 2/2012 | Howell et al. |
| 8,223,088 B1 * | 7/2012 | Gomez et al. ..................... 345/7 |
| 8,253,685 B2 * | 8/2012 | Katayama .................... 345/157 |
| 8,259,064 B2 * | 9/2012 | Kato et al. .................... 345/158 |
| 2009/0300535 A1 | 12/2009 | Skourup et al. |
| 2010/0125812 A1 | 5/2010 | Hartman et al. |
| 2010/0199232 A1 * | 8/2010 | Mistry et al. .................. 715/863 |
| 2011/0213664 A1 | 9/2011 | Osterhout et al. |
| 2011/0227820 A1 * | 9/2011 | Haddick et al. ............... 345/156 |

FOREIGN PATENT DOCUMENTS

| WO | 2008027685 | 3/2008 |
|---|---|---|
| WO | 2010076375 | 7/2010 |

* cited by examiner

*Primary Examiner* — Joe H Cheng
(74) *Attorney, Agent, or Firm* — McDonnell Boehnen Hulbert & Berghoff LLP

(57) ABSTRACT

In accordance with example embodiments, hand gestures can be used to provide user input to a wearable computing device, and in particular to identify, signify, or otherwise indicate what may be considered or classified as important or worthy of attention or notice. A wearable computing device, which could include a head-mounted display (HMD) and a video camera, may recognize known hand gestures and carry out particular actions in response. Particular hand gestures could be used for selecting portions of a field of view of the HMD, and generating images from the selected portions. The HMD could then transmit the generated images to one or more applications in a network server communicatively connected with the HMD, including a server or server system hosting a social networking service.

39 Claims, 16 Drawing Sheets

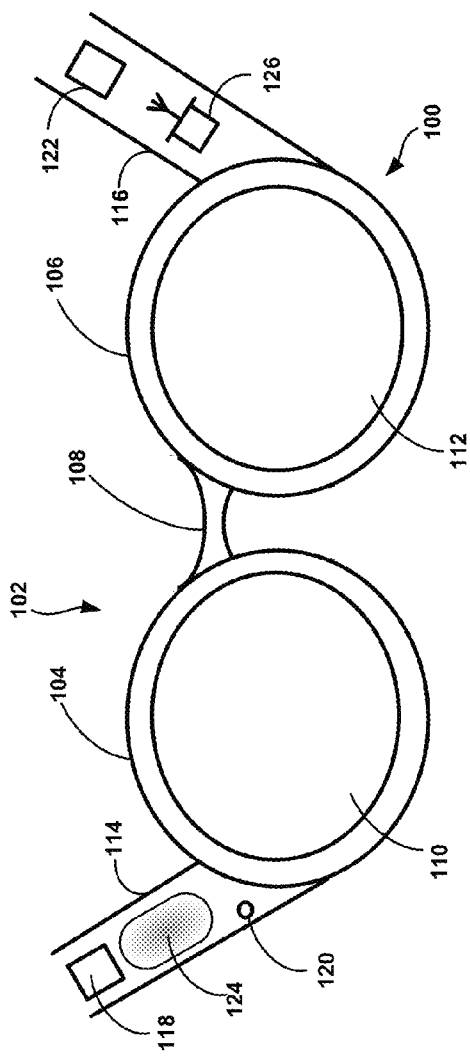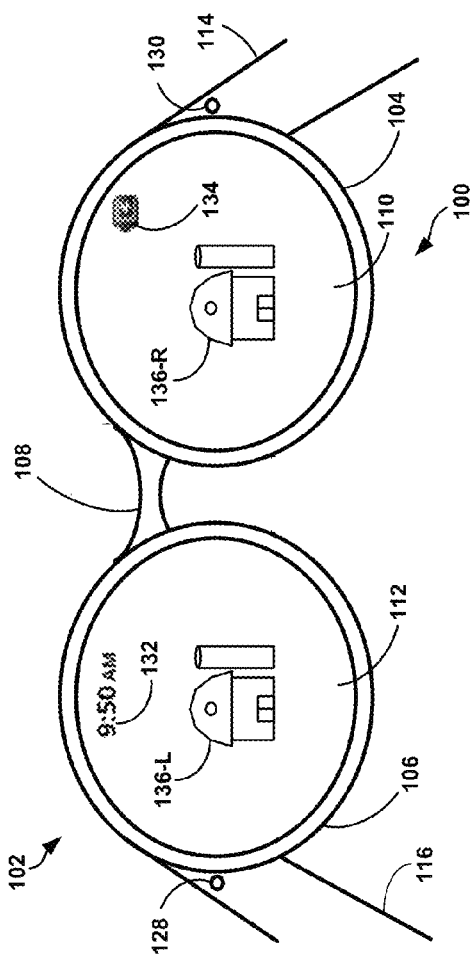
FIG. 1a
FIG. 1b

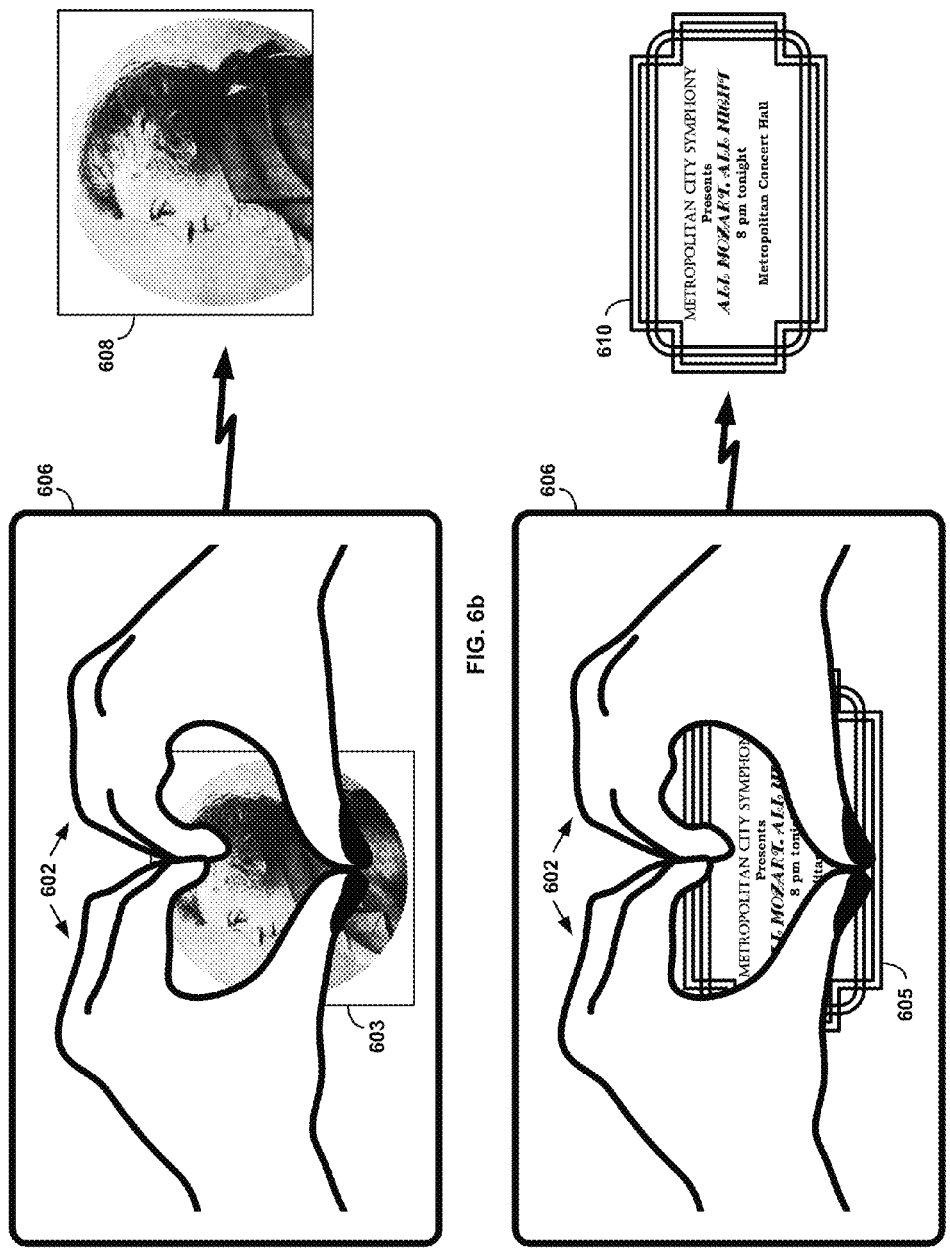

HAND GESTURES TO SIGNIFY WHAT IS IMPORTANT

BACKGROUND

Unless otherwise indicated herein, the materials described in this section are not prior art to the claims in this application and are not admitted to be prior art by inclusion in this section.

Various technologies can be utilized to provide users with electronic access to data and services in communication networks, as well as to support communication between users. For example, devices such as computers, telephones, and personal digital assistants (PDAs) can be used to exchange information over communication networks including the Internet. Communication networks may in turn provide communication paths and links to servers, which can host applications, content, and services that may be accessed or utilized by users via communication devices. The content can include text, video data, audio data and/or other types of data.

SUMMARY

In one aspect, an example embodiment presented herein provides, in a wearable head-mounted display (HMD), a computer-implemented method comprising: making a determination that video data from a video camera of the wearable HMD includes a hand gesture forming an area bounded by two hands in a shape of a symbolic heart; determining that the two hands are associated with the wearable HMD via analysis of the video data including the hand gesture; generating an image from the video data, wherein the image includes the area bounded by the two hands; matching the shape of the symbolic heart with a predetermined action associated with the image; and executing the predetermined action on a processor of the wearable HMD.

In another aspect, an example embodiment presented herein provides, in a wearable head-mounted display (HMD), a computer-implemented method comprising: making a determination that video data from a video camera of the wearable HMD includes a hand gesture of a thumb and forefinger of a particular hand forming a shape of a symbolic right angle moving from a first location to a second location in a field of view (FOV) of the wearable HMD; determining that the particular hand is associated with the wearable HMD via analysis of the video data including the hand gesture; determining a closed area in the FOV bounded by a rectangle having a first corner at a vertex of the symbolic right angle at the first location and a diagonally-opposite second corner at a vertex of the symbolic right angle at the second location; generating an image from the video data of a sub-FOV within the closed area; matching the shape of the symbolic right angle with a predetermined action associated with the image; and executing the predetermined executable action on a processor of the wearable HMD.

In another aspect, an example embodiment presented herein provides, in a wearable head-mounted display (HMD), a computer-implemented method comprising: making a determination that video data from a video camera of the wearable HMD includes a hand gesture of a forefinger of a particular hand tracing a closed-loop shape in a field of view (FOV) of the wearable HMD; determining that the particular hand is associated with the wearable HMD via analysis of the video data including the hand gesture; determining a closed area in the FOV bounded by the closed-loop shape; generating an image from the video data of a sub-FOV within the closed area; responsive to both making the determination and generating the image, identifying a predetermined action associated with the image; and executing the predetermined action on a processor of the wearable HMD.

In another aspect, an example embodiment presented herein provides a wearable head-mounted display (HMD) comprising: a display device; a video camera; one or more processors; memory; and machine-readable instructions stored in the memory that, when executed by the one or more processors, cause the wearable HMD to carry out functions including: making a determination that video data from the video camera includes a hand gesture forming an area bounded by two hands in a shape of a symbolic heart, determining that the two hands are associated with the wearable HMD via analysis of the video data including the hand gesture, generating an image from the video data, wherein the image includes the area bounded by the two hands, matching the shape of the symbolic heart with a predetermined action associated with the image, and executing the predetermined action on a processor of the wearable HMD.

In another aspect, an example embodiment presented herein provides a nontransitory computer-readable medium having instructions stored thereon that, upon execution by one or more processors of a wearable head-mounted display (HMD), cause the wearable HMD to carry out functions comprising: making a determination that video data from a video camera of the wearable HMD includes a hand gesture forming an area bounded by two hands in a shape of a symbolic heart; determining that the two hands are associated with the wearable HMD via analysis of the video data including the hand gesture; generating an image from the video data, wherein the image includes the area bounded by the two hands; matching the shape of the symbolic heart with a predetermined action associated with the image; and executing the predetermined action on a processor of the wearable HMD.

In another aspect, an example embodiment presented herein provides a wearable head-mounted display (HMD) comprising: a display device; a video camera; one or more processors; memory; and machine-readable instructions stored in the memory that, when executed by the one or more processors, cause the wearable HMD to carry out functions including: making a determination that video data from the video camera includes a hand gesture of a thumb and forefinger of a particular hand forming a shape of a symbolic right angle moving from a first location to a second location in a field of view (FOV) of the wearable HMD, determining that the particular hand is associated with the wearable HMD via analysis of the video data including the hand gesture, determining a closed area in the FOV bounded by a rectangle having a first corner at a vertex of the symbolic right angle at the first location and a diagonally-opposite second corner at a vertex of the symbolic right angle at the second location, generating an image from the video data of a sub-FOV within the closed area, matching the shape of the symbolic right angle with a predetermined action associated with the image, and executing the predetermined executable action on a processor of the wearable HMD.

In another aspect, an example embodiment presented herein provides a nontransitory computer-readable medium having instructions stored thereon that, upon execution by one or more processors of a wearable head-mounted display (HMD), cause the wearable HMD to carry out functions comprising: making a determination that video data from a video camera of the wearable HMD includes a hand gesture of a thumb and forefinger of a particular hand forming a shape of a symbolic right angle moving from a first location to a second location in a field of view (FOV) of the wearable HMD; determining that the particular hand is associated with the wearable HMD via analysis of the video data including the hand gesture; determining a closed area in the FOV bounded by a rectangle having a first corner at a vertex of the symbolic right angle at the first location and a diagonally-opposite second corner at a vertex of the symbolic right angle at the second location; generating an image from the video data of a sub-FOV within the closed area; matching the shape of the symbolic right angle with a predetermined action associated with the image; and executing the predetermined executable action on a processor of the wearable HMD.

In another aspect, an example embodiment presented herein provides a wearable head-mounted display (HMD) comprising: a display device; a video camera; one or more processors; memory; and machine-readable instructions stored in the memory that, when executed by the one or more processors, cause the wearable HMD to carry out functions including: making a determination that video data from the video camera includes a hand gesture of a forefinger of a particular hand tracing a closed-loop shape in a field of view (FOV) of the wearable HMD, determining that the particular hand is associated with the wearable HMD via analysis of the video data including the hand gesture, determining a closed area in the FOV bounded by the closed-loop shape, generating an image from the video data of a sub-FOV within the closed area, responsive to both making the determination and generating the image, identifying a predetermined action associated with the image, and executing the predetermined action on a processor of the wearable HMD.

In another aspect, an example embodiment presented herein provides a nontransitory computer-readable medium having instructions stored thereon that, upon execution by one or more processors of a wearable head-mounted display (HMD), cause the wearable HMD to carry out functions comprising: making a determination that video data from a video camera of the wearable HMD includes a hand gesture of a forefinger of a particular hand tracing a closed-loop shape in a field of view (FOV) of the wearable HMD; determining that the particular hand is associated with the wearable HMD via analysis of the video data including the hand gesture; determining a closed area in the FOV bounded by the closed-loop shape; generating an image from the video data of a sub-FOV within the closed area; responsive to both making the determination and generating the image, identifying a predetermined action associated with the image; and executing the predetermined action on a processor of the wearable HMD.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF DRAWINGS

FIG. 1a is a first view of an example wearable head-mounted display for receiving, transmitting and displaying data, in accordance with an example embodiment.

FIG. 1b is a second view of an example wearable head-mounted display of FIG. 1a, in accordance with an example embodiment.

FIG. 6b is one illustration of using a heart-shaped hand gesture in a viewing area of a display, according to an example embodiment.

FIG. 6c is another illustration of using a heart-shaped hand gesture in a viewing area of a display, according to an example embodiment.

DETAILED DESCRIPTION

1. Overview

Figure 2:
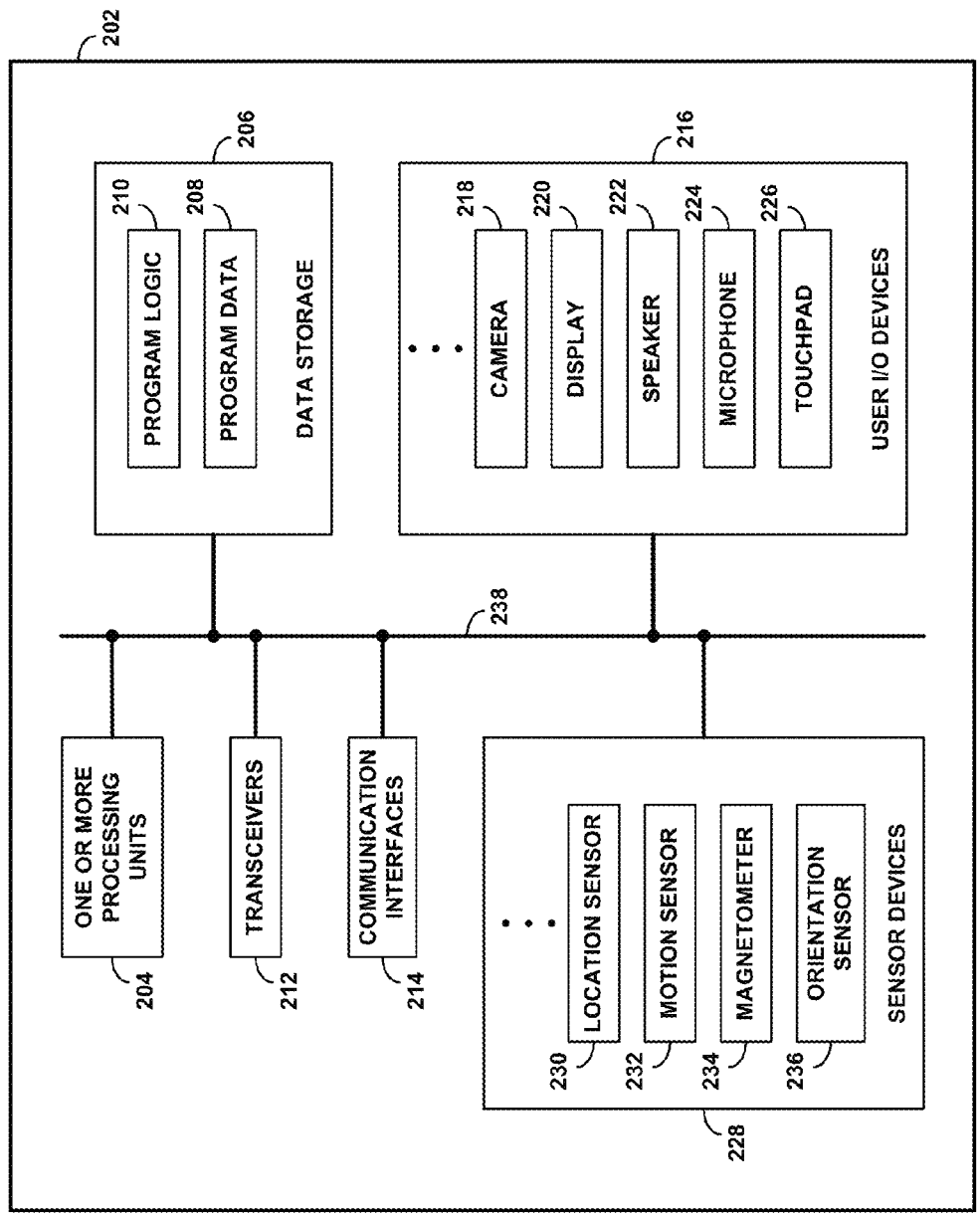
FIG. 2 is block diagram of a wearable head-mounted display, in accordance with an example embodiment.

In accordance with example embodiments, hand gestures can be used to provide user input to a wearable computing device, and in particular to identify, signify, or otherwise indicate what may be considered or classified as important or worthy of attention or notice, for example. More specifically, a hand gesture can serve to visually select an item or object viewable with the wearable computing device, whereby the act of selection may be taken to indicate or convey or assign a subjective value or qualitative ranking attributable to the visually-selected item or object. A visually-selected item or object may then be rendered in a visually-representational form (e.g., an image) as input to a wearable computing device. Hand gestures may further serve to associate particular actions or applications with visually-selected items or objects, or with visual representations of the items or objects.

Also in accordance with example embodiments, a wearable computing device may include a head-mounted display (HMD) having eyeglasses or goggles that can combine computer-generated images displayed on the eye-facing surfaces of lens elements with an actual field of view observable through the lens elements. The capability presenting the combination of the actual, observed field-of-view (FOV) with the displayed, computer-generated images can be complemented or supplemented with various functions and applications, as well as with various forms of user input and sensory data from ancillary wearable computing components, to provide rich and varied experiences and utility for a user or wearer of the HMD.

In an example embodiment, a HMD can be further equipped with a video camera device capable of capturing video and still-image data of a FOV of the HMD. For example, the video camera device can have a FOV that is the same as, or substantially overlapping that of, a user or wearer of the HMD. Video and still-image data captured by the video camera device can serve as a form of input to the HMD.

In accordance with example embodiments, video and still-image data captured by the video camera device and/or analysis of that data can be used to recognize or identify the occurrence or appearance of known hand gestures in the FOV of the camera device. Upon recognition, a known hand gesture can then be interpreted as input to the HMD. For example, a particular gesture could be associated with a particular command, application, or other invokable action on the HMD.

In further accordance with example embodiments, an HMD can be communicatively connected with a communication network, and can exchange data with a server or server system (other device) in the network. In still further accordance with example embodiments, applications and/or commands invoked by hand gestures could involve communication with a server or server system in the communication network. For example, a hand gesture could cause a program running on the wearable HMD to upload and/or download content (e.g., media data) to/from the server.

In yet further accordance with example embodiments, the wearable HMD could additionally or alternatively be communicatively connected with one or more other HMDs, either directly (e.g., a wireless protocol such as Bluetooth) or via a network (e.g., a cellular network, WiFi, etc.). In such an arrangement, applications and/or commands invoked by hand gestures on the wearable HMD could involve communication with one or more of the other HMDs. For example, a hand gesture could cause a program running on the wearable HMD to upload and/or download content (e.g., media data) to/from another one of the HMDs. Similarly, communication with the wearable HMD could be invoked by hand gestures applied at another one of the HMDs.

Example embodiments herein include three specific hand gestures for visually selecting an object or item in the FOV of the HMD, or some viewable region within the FOV of the HMD, and then applying a respective, particular action to an image of the object or item (or of the selected region of the FOV). In the example embodiments, it may be taken at least for illustrative purposes that the hand gestures are carried out by a wearer or user of the HMD, and thus may serve as input by the user or wearer, and further may serve as conveying the intent or disposition of the user or wearer with respect to the visually-selected objects or items. It will be appreciated, however, that a particular or specific user or wearer need not necessarily be presumed or invoked to understand all aspects of the example methods.

In accordance with an example embodiment, a hand gesture of two hands forming a symbolic heart shape may be used to select a region of the FOV of a HMD that is bounded by the two hands. An image of the selected region may then be generated, and a particular action may be carried out or applied to the image. In further accordance with the example embodiment, the particular action may be to transmit the image to a server in a network. More particularly, the image may be transmitted in a message that also includes an indication that the image is "liked," and the server that receives the message may be part of a social networking service. In this way, the heart-shaped gesture may serve to enable a user or wearer of an HMD to communicate to a social networking service that she or he "likes" an object, item, or subject of an image captured within the heart-shaped gesture. The social networking service (or other server application or service) may additionally or alternatively respond to receiving the message by performing a network-based information search based on the image, possibly as well as based on the image being "liked," and returning a result of the search to the HMD.

In accordance with an example embodiment, a hand gesture of a hand forming a symbolic right-angle shape may be used to select a region of the FOV of a HMD. An image of the selected region may then be generated, and a particular action may be carried out or applied to the image. In further accordance with the example embodiment, the particular action may be to transmit the image to a server in a network. More particularly, the image may be transmitted in a message that also includes a request to post the image online, and the server that receives the message may be part of a social networking service. In this way, the right-angle-shaped gesture may serve to enable a user or wearer of an HMD to upload and post an image to a social networking service. The social networking service (or other server application or service) may additionally or alternatively respond to receiving the message by performing a network-based information search based on the image, and returning a result of the search to the HMD.

In accordance with an example embodiment, a hand gesture of a hand forming a closed-loop shape may be used to select a region of the FOV of a HMD. An image of the selected region may then be generated, and a particular action may be carried out or applied to the image. In further accordance with the example embodiment, the particular action may be to transmit the image to a server in a network. More particularly, the image may be transmitted in a message that also includes a request to post the image online, and the server that receives the message may be part of a social networking service. In this way, the closed-loop-shaped gesture may serve to enable a user or wearer of an HMD to upload and post an image to a social networking service. The social networking service (or other server application or service) may additionally or alternatively respond to receiving the message by performing a network-based information search based on the image, and returning a result of the search to the HMD.

Additionally or alternatively, the heart-shaped hand gesture may serve to enable a user or wearer of an HMD to communicate to a to one or more other HMDs (e.g., wearers of the one or more other HMDs) that she or he "likes" an object, item, or subject of an image captured within the heart-shaped gesture. Similarly, the right-angle-shaped gesture may serve to enable a user or wearer of an HMD to transmit an image to one or more other HMDs, and the closed-loop-shaped gesture may also serve to enable a user or wearer of an HMD to transmit an image to one or more other HMDs.

2. Example Systems and Network a. Example Wearable Computing System

In accordance with an example embodiment, a wearable computing system may comprise various components, including one or more processors, one or more forms of memory, one or more sensor devices, one or more I/O devices, one or more communication devices and interfaces, and a head-mounted display (HMD), all collectively arranged in a manner to make the system wearable by a user. The wearable computing system may also include machine-language logic (e.g., software, firmware, and/or hardware instructions) stored in one or another form of memory and executable by one or another processor of the system in order to implement one or more programs, tasks, applications, or the like. The wearable computing system may be configured in various form factors, including, without limitation, integrated in the HMD as a unified package, or distributed, with one or more elements integrated in the HMD and one or more others separately wearable (e.g., as a garment, in a garment pocket, as jewelry, etc.).

Although described above as a component of a wearable computing system, it is sometimes convenient to consider an HMD to be (or at least to represent) the wearable computing system. Accordingly, unless otherwise specified, the terms "wearable head-mounted display" (or "wearable HMD") or just "head-mounted display" (or "HMD") will be used herein to refer to a wearable computing system, in either an integrated (unified package) form, a distributed (or partially distributed) form, or other wearable form.

FIG. 1a illustrates an example wearable computing system 100 for receiving, transmitting, and displaying data. In accordance with an example embodiment, the wearable computing system 100 is depicted as a wearable HMD taking the form of eyeglasses 102. However, it will be appreciated that other types of wearable computing devices could additionally or alternatively be used.

As illustrated in FIG. 1a, the eyeglasses 102 comprise frame elements including lens-frames 104 and 106 and a center frame support 108, lens elements 110 and 112, and extending side-arms 114 and 116. The center frame support 108 and the extending side-arms 114 and 116 are configured to secure the eyeglasses 102 to a user's face via a user's nose and ears, respectively. Each of the frame elements 104, 106, and 108 and the extending side-arms 114 and 116 may be formed of a solid structure of plastic or metal, or may be formed of a hollow structure of similar material so as to allow wiring and component interconnects to be internally routed through the eyeglasses 102. Each of the lens elements 110 and 112 may include a material on which an image or graphic can be displayed. In addition, at least a portion of each lens elements 110 and 112 may be sufficiently transparent to allow a user to see through the lens element. These two features of the lens elements could be combined; for example, to provide an augmented reality or heads-up display where the projected image or graphic can be superimposed over or provided in conjunction with a real-world view as perceived by the user through the lens elements.

The extending side-arms 114 and 116 are each projections that extend away from the frame elements 104 and 106, respectively, and are positioned behind a user's ears to secure the eyeglasses 102 to the user. The extending side-arms 114 and 116 may further secure the eyeglasses 102 to the user by extending around a rear portion of the user's head. Additionally or alternatively, the wearable computing system 100 may be connected to or be integral to a head-mounted helmet structure. Other possibilities exist as well.

The wearable computing system 100 may also include an on-board computing system 118, a video camera 120, a sensor 122, a finger-operable touch pad 124, and a communication interface 126. The on-board computing system 118 is shown to be positioned on the extending side-arm 114 of the eyeglasses 102; however, the on-board computing system 118 may be provided on other parts of the eyeglasses 102. The on-board computing system 118 may include, for example, a one or more processors and one or more forms of memory. The on-board computing system 118 may be configured to receive and analyze data from the video camera 120, the sensor 122, the finger-operable touch pad 124, and the wireless communication interface 126 (and possibly from other sensory devices and/or user interfaces) and generate images for output to the lens elements 110 and 112.

The video camera 120 is shown to be positioned on the extending side-arm 114 of the eyeglasses 102; however, the video camera 120 may be provided on other parts of the eyeglasses 102. The video camera 120 may be configured to capture images (including still images) at various resolutions or at different frame rates. Video cameras with a small form factor, such as those used in cell phones or webcams, for example, may be incorporated into an example of the wearable system 100. Although FIG. 1a illustrates one video camera 120, more video cameras may be used, and each may be configured to capture the same view, or to capture different views. For example, the video camera 120 may be forward facing to capture at least a portion of a real-world view perceived by the user. This forward facing image captured by the video camera 120 may then be used to generate an augmented reality where computer generated images appear to interact with the real-world view perceived by the user.

The sensor 122 is shown mounted on the extending side-arm 116 of the eyeglasses 102; however, the sensor 122 may be provided on other parts of the eyeglasses 102. Although depicted as a single component, the sensor 122 in FIG. 1a could include more than one type of sensor device or element. By way of example and without limitation, the sensor 122 could include one or more of a motion detector (e.g., a gyroscope and/or an accelerometer), a location determination device (e.g., a GPS device), a magnetometer, and an orientation sensor (e.g., a theodolite). Other sensing devices or elements may be included within the sensor 122 and other sensing functions may be performed by the sensor 122.

The finger-operable touch pad 124, shown mounted on the extending side-arm 114 of the eyeglasses 102, may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel to the pad surface, in a direction normal to the pad surface, or both, and may also be capable of sensing a level of pressure applied. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge of the finger-operable touch pad 124. Although not shown in FIG. 1a, the eyeglasses 102 could include one more additional finger-operable touch pads, for example attached to the extending side-arm 116, which could be operated independently of the finger-operable touch pad 124 to provide a duplicate and/or different function.

The communication interface 126 could include an antenna and transceiver device for support of wireline and/or wireless communications between the wearable computing system 100 and a remote device or communication network. For instance, the communication interface 126 could support wireless communications with any or all of 3 G and/or 4 G cellular radio technologies (e.g., CDMA, EVDO, GSM, UMTS, LTE, WiMAX), as well as wireless local or personal area network technologies such as a Bluetooth, Zigbee, and WiFi (e.g., 802.11a, 802.11b, 802.11g). Other types of wireless access technologies could be supported as well. The communication interface 126 could enable communications between the wearable computing system 100 and one or more end devices, such as another wireless communication device (e.g., a cellular phone or another wearable computing device), a user at a computer in a communication network, or a server or server system in a communication network. The communication interface 126 could also support wired access communications with Ethernet or USB connections, for example.

FIG. 1b illustrates another view of the wearable computing system 100 of FIG. 1a. As shown in FIG. 1b, the lens elements 110 and 112 may act as display elements. In this regard, the eyeglasses 102 may include a first projector 128 coupled to an inside surface of the extending side-arm 116 and configured to project a display image 132 onto an inside surface of the lens element 112. Additionally or alternatively, a second projector 130 may be coupled to an inside surface of the extending side-arm 114 and configured to project a display image 134 onto an inside surface of the lens element 110.

The lens elements 110 and 112 may act as a combiner in a light projection system and may include a coating that reflects the light projected onto them from the projectors 128 and 130. Alternatively, the projectors 128 and 130 could be scanning laser devices that interact directly with the user's retinas.

A forward viewing field may be seen concurrently through lens elements 110 and 112 with projected or displayed images (such as display images 132 and 134). This is represented in FIG. 1b by the field of view (FOV) object 136-L in the left lens element 112 and the same FOV object 136-R in the right lens element 110. The combination of displayed images and real objects observed in the FOV may be one aspect of augmented reality, referenced above.

In alternative embodiments, other types of display elements may also be used. For example, lens elements 110, 112 may include: a transparent or semi-transparent matrix display, such as an electroluminescent display or a liquid crystal display; one or more waveguides for delivering an image to the user's eyes; and/or other optical elements capable of delivering an in focus near-to-eye image to the user. A corresponding display driver may be disposed within the frame elements 104 and 106 for driving such a matrix display. Alternatively or additionally, a scanning laser device, such as low-power laser or LED source and accompanying scanning system, can draw a raster display directly onto the retina of one or more of the user's eyes. The user can then perceive the raster display based on the light reaching the retina.

Although not shown in FIGS. 1a and 1b, the wearable system 100 can also include one or more components for audio output. For example, wearable computing system 100 can be equipped with speaker(s), earphone(s), and/or earphone jack(s). Other possibilities exist as well.

While the wearable computing system 100 of the example embodiment illustrated in FIGS. 1a and 1b is configured as a unified package, integrated in the HMD component, other configurations are possible as well. For example, although not explicitly shown in FIGS. 1a and 1b, the wearable computing system 100 could be implemented in a distributed architecture in which all or part of the on-board computing system 118 is configured remotely from the eyeglasses 102. For example, some or all of the on-board computing system 118 could be made wearable in or on clothing as an accessory, such as in a garment pocket or on a belt clip. Similarly, other components depicted in FIGS. 1a and/or 1b as integrated in the eyeglasses 102 could also be configured remotely from the HMD component. In such a distributed architecture, certain components might still be integrated in HMD component. For instance, one or more sensors (e.g., an accelerometer and/or an orientation sensor) could be integrated in eyeglasses 102.

In an example distributed configuration, the HMD component (including other integrated components) could communicate with remote components via the communication interface 126 (or via a dedicated connection, distinct from the communication interface 126). By way of example, a wired (e.g. USB or Ethernet) or wireless (e.g., WiFi or Bluetooth) connection could support communications between a remote computing system and a HMD component. Additionally, such a communication link could be implemented between a HMD component and other remote devices, such as a laptop computer or a mobile telephone, for instance.

FIG. 2 is a block diagram depicting functional components of an example wearable computing system 202 in accordance with an example embodiment. As shown in FIG. 2, the example wearable computing system 202 includes one or more processing units 204, data storage 206, transceivers 212, communication interfaces 214, user input/output (I/O) devices 216, and sensor devices 228, all of which may be coupled together by a system bus 238 or other communicative interconnection means. These components may be arranged to support operation in accordance with an example embodiment of a wearable computing system, such as system 100 shown in FIGS. 1a and 1b, or other a wearable HMD.

The one or more processing units 204 could include one or more general-purpose processors (e.g., INTEL microprocessors) and/or one or more special-purpose processors (e.g., dedicated digital signal processor, application specific integrated circuit, etc.). In turn, the data storage 206 could include one or more volatile and/or non-volatile storage components, such as magnetic or optical memory or disk storage. Data storage 206 can be integrated in whole or in part with processing unit 204, as cache memory or registers for instance. As further shown, data storage 206 is equipped to hold program logic 210 and program data 208.

Program logic 210 could include machine language instructions (e.g., software code, firmware code, etc.) that define routines executable by the one or more processing units 204 to carry out various functions described herein. Program data 208 could contain data used or manipulated by one or more applications or programs executable by the one or more processors. Such data can include, among other forms of data, program-specific data, user data, input/output data, sensor data, or other data and information received, stored, retrieved, transmitted, analyzed, or modified in the course of execution of one or more programs or applications.

The transceivers 212 and communication interfaces 214 may be configured to support communication between the wearable computing system 202 and one or more end devices, such as another wireless communication device (e.g., a cellular phone or another wearable computing device), a user at a computer in a communication network, or a server or server system in a communication network. The transceivers 212 may be coupled with one or more antennas to enable wireless communications, for example, as describe above for the wireless communication interface 126 shown in FIG. 1a. The transceivers 212 may also be coupled with one or more and wireline connectors for wireline communications such as Ethernet or USB. The transceivers 212 and communication interfaces 214 could also be used support communications within a distributed-architecture in which various components of the wearable computing system 202 are located remotely from one another. In this sense, the system bus 238 could include elements and/or segments that support communication between such distributed components.

As shown, the user I/O devices 216 include a camera 218, a display 220, a speaker 222, a microphone 224, and a touchpad 226. The camera 218 could correspond to the video camera 120. Similarly, the display 220 could correspond to an image processing and display system for making images viewable to a user (wearer) of an HMD. The display 220 could include, among other elements, the first and second projectors 128 and 130 coupled with lens elements 112 and 110, respectively, for generating image displays as described above for FIG. 1b. The touchpad 226 could correspond to the finger-operable touch pad 124, as described for FIG. 1a. The speaker 422 and microphone 224 could similarly correspond to components referenced in the discussion above of FIGS. 1a and 1b. Each of the user I/O devices 216 could also include a device controller and stored, executable logic instructions, as well as an interface for communication via the system bus 238.

The sensor devices 228, which could correspond to the sensor 122 described above for FIG. 1a, include a location sensor 230, a motion sensor 232, a magnetometer 234, and an orientation sensor 236. The location sensor 230 could correspond to a Global Positioning System (GPS) device, or other location-determination device (e.g. mobile phone system triangulation device, etc.). The motion sensor 232 could correspond to an accelerometer or one or more gyroscopes.

The orientation sensor 236 could include a theodolite for determining an angular orientation of a reference pointing direction of the HMD with respect to a local terrestrial coordinate system. For instance, the orientation sensor could determine an altitude angle with respect to horizontal and an azimuth angle with respect to geographic (or geodetic) North of a forward pointing direction of the HMD. Other angles and coordinate systems could be used as well for determining orientation.

The magnetometer 234 could be used to determine the strength and direction of the Earth's magnetic (geomagnetic) field as measured at a current location of the HMD. The magnetometer could be used as a compass, possibly in conjunction with the orientation sensor for determining the azimuth angle.

Each of the sensor devices 228 could also include a device controller and stored, executable logic instructions, as well as an interface for communication via the system bus 238.

It will be appreciated that there can be numerous specific implementations of a wearable computing system or wearable HMD, such as the wearable computing system 202 illustrated in FIG. 2. Further, one of skill in the art would understand how to devise and build such an implementation.

b. Example Network

In an example embodiment, an HMD can support communications with a network and with devices in or communicatively connected with a network. Such communications can include exchange of information between the HMD and another device, such as another connected HMD, a mobile computing device (e.g., mobile phone or smart phone), or a server. Information exchange can support or be part of services and/or applications, including, without limitation, uploading and/or downloading content (e.g., music, video, etc.), and client-server communications, among others.

Figure 3:
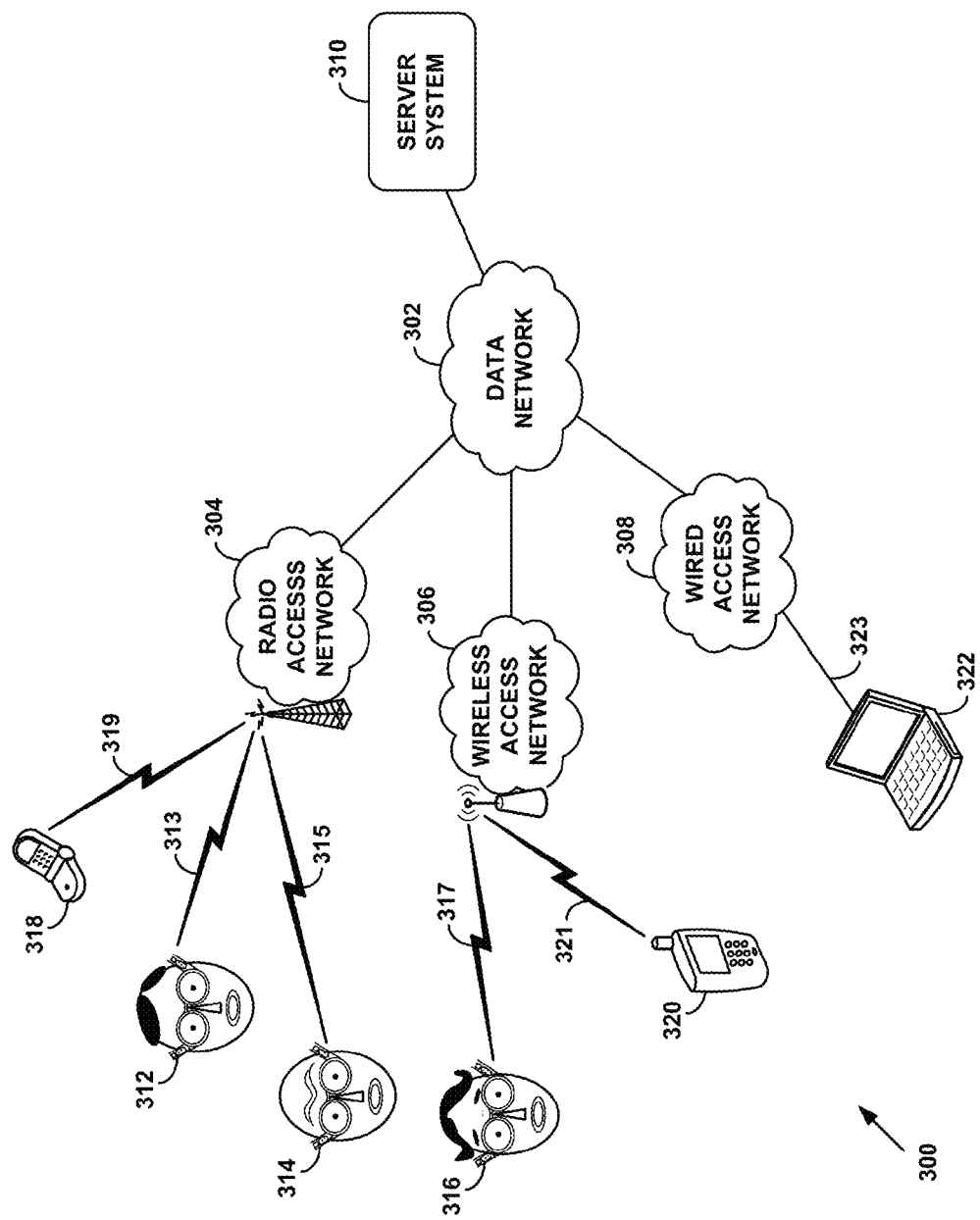
FIG. 3 is a simplified block diagram of a communication network in which one or more example wearable head-mounted displays can be operated, in accordance with an example embodiment.

FIG. 3 illustrates one view of a network 300 in which one or more HMDs could engage in communications. As depicted, the network 300 includes a data network 302 that is connected to each of a radio access network (RAN) 304, a wireless access network 306, and a wired access network 308. The data network 302 could represent the one or more interconnected communication networks, such as or including the Internet. The radio access network 304 could represent a service provider's cellular radio network supporting, for instance, 3 G and/or 4 G cellular radio technologies (e.g., CDMA, EVDO, GSM, UMTS, LTE, WiMAX). The wireless access network 306 could represent a residential or hot-spot wireless area network supporting, such as, Bluetooth, ZigBee, and WiFi (e.g., 802.11a, 802.11b, 802.11g). The wired access network 308 could represent a residential or commercial local area network supporting, for instance, Ethernet.

The network 300 also includes a server system 310 connected to the data network 302. The server system 310 could represent a website or other network-based facility for providing one or another type of service to users. For instance, in accordance with an example embodiment, the server system 310 could support or host a social networking service. As another example, the server system 310 could support or host a network-based search service. As still another example, the server system 310 could support or host both a social networking service and a network-based search service. It will be appreciated that other types of services could additionally or alternatively be supported by the server system 310.

FIG. 3 also shows various end-user and/or client devices connected to the network 300 via one of the three access networks. By way of example, an HMD 312 is connected to the RAN 304 via an air interface 313 (e.g., a 3 G or 4 G technology), and an HMD 314 is connected to the RAN 304 via an air interface 315 (e.g., a 3 G or 4 G technology). Also by way of example, an HMD 316 is connected to the wireless access network 306 via an air interface 317 (e.g., a WiFi technology). In addition and also by way of example, a mobile phone 318 is shown connected to the RAN 304 via an air interface 319, a smart phone 320 is shown connected to the wireless access network 306 via an air interface 321, and a laptop computer 322 is shown connected to the wired access network 308 via a wired interface 323. Each of the end-user devices (including HMDs 312, 314, and 316) could communicate with one or another network-connected device via its respective connection with the network. It could be possible as well for some of these end-user devices (including HMDs 312, 314, and 316) to communicate directly with each other (or other end-user devices not shown).

Each of the HMDs 312, 314, and 316 is depicted as being worn by different user (each user being represented by a cartoon face) in order to signify possible user-related variables, circumstances, and applications that may be associated with each HMD. However, for the purposes of most of the discussion herein it is usually sufficient to reference only a HMD without referencing the user (or wearer) the HMD. Explicit reference to or discussion of a user (or wearer) of an HMD will be made as necessary.

c. Example Server System

Figure 4A:
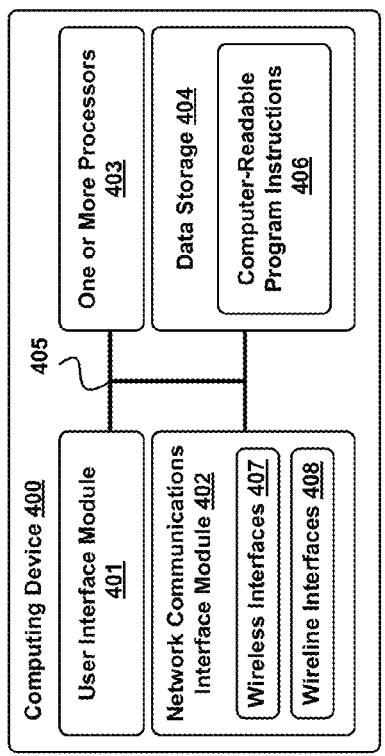
FIG. 4a is a block diagram of a computing device, in accordance with an example embodiment.
Figure 4B:
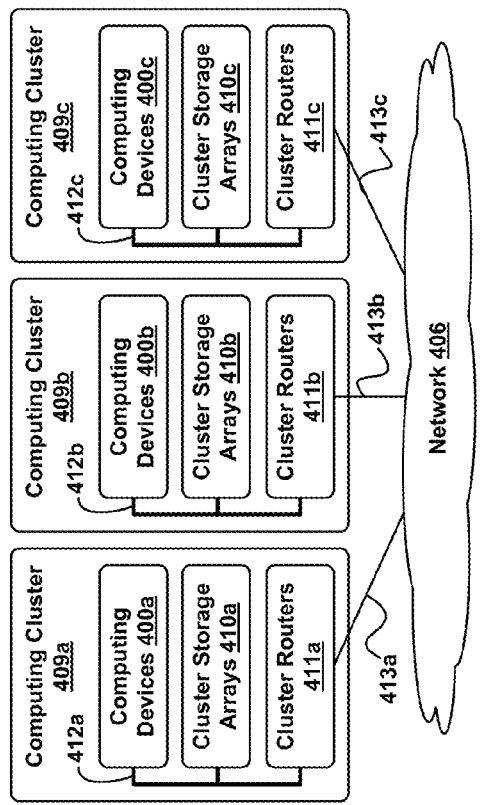
FIG. 4b depicts a network with clusters of computing devices of the type shown in FIG. 4a, in accordance with an example embodiment.

A network server, such as the server system 310 in FIG. 3, could take various forms and be implemented in one or more different ways. FIGS. 4a and 4b illustrate two example embodiments of a server system: an integrated system including a representative computing device (FIG. 4a), and a distributed system (FIG. 4b) including multiple representative computing devices, as well as additional system elements, communicatively connected together.

FIG. 4a is a block diagram of a computing device 400 in accordance with an example embodiment. The computing device 400 can include a user interface module 401, a network-communication interface module 402, one or more processors 403, and data storage 404, all of which can be linked together via a system bus, network, or other connection mechanism 405.

The user interface module 401 can be operable to send data to and/or receive data from external user input/output devices. For example, the user interface module 401 can be configured to send/receive data to/from user input devices such as a keyboard, a keypad, a touch screen, a computer mouse, a track ball, a joystick, and/or other similar devices, now known or later developed. The user interface module 401 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. The user interface module 401 can also be configured to generate audible output(s), such as a speaker, speaker jack, audio output port, audio output device, earphones, and/or other similar devices, now known or later developed.

The network-communications interface module 402 can include one or more wireless interfaces 407 and/or wireline interfaces 408 that are configurable to communicate via a network, such as the network 302 shown in FIG. 3. The wireless interfaces 407 can include one or more wireless transceivers, such as a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other types of wireless transceivers configurable to communicate via a wireless network. The wireline interfaces 408 can include one or more wireline transceivers, such as an Ethernet transceiver, a Universal Serial Bus (USB) transceiver, or similar transceiver configurable to communicate via a wire, a twisted pair of wires, a coaxial cable, an optical link, a fiber-optic link, or other physical connection to a wireline network.

In some embodiments, the network communications interface module 402 can be configured to provide reliable, secured, compressed, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be compressed and decompressed using one or more compression and/or decompression algorithms and/or protocols such as, but not limited to, one or more lossless data compression algorithms and/or one or more lossy data compression algorithms. Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

The one or more processors 403 can include one or more general purpose processors and/or one or more special purpose processors (e.g., digital signal processors, application specific integrated circuits, etc.). The one or more processors 403 can be configured to execute computer-readable program instructions 406 that are contained in the data storage 404 and/or other instructions as described herein.

The data storage 404 can include one or more computer-readable storage media that can be read or accessed by at least one of the processors 403. The one or more computer-readable storage media can include volatile and/or non-volatile storage components, such as optical, magnetic, organic or other memory or disc storage, which can be integrated in whole or in part with at least one of the one or more processors 403. In some embodiments, the data storage 404 can be implemented using a single physical device (e.g., one optical, magnetic, organic or other memory or disc storage unit), while in other embodiments, the data storage 404 can be implemented using two or more physical devices.

Computer-readable storage media associated with data storage 404 and/or other computer-readable media described herein can also include non-transitory computer-readable media such as computer-readable media that stores data for short periods of time like register memory, processor cache, and random access memory (RAM). Computer-readable storage media associated with data storage 404 and/or other computer-readable media described herein can also include non-transitory computer readable media that stores program code and/or data for longer periods of time, such as secondary or persistent long term storage, like read only memory (ROM), optical or magnetic disks, compact-disc read only memory (CD-ROM), for example. Computer-readable storage media associated with data storage 404 and/or other computer-readable media described herein can also be any other volatile or non-volatile storage systems. Computer-readable storage media associated with data storage 404 and/or other computer-readable media described herein can be considered computer readable storage media for example, or a tangible storage device.

The data storage 404 can include computer-readable program instructions 406 and perhaps additional data. In some embodiments, the data storage 404 can additionally include storage required to perform at least part of the herein-described techniques, methods, and/or at least part of the functionality of the herein-described devices and networks.

FIG. 4b depicts a network 406 with computing clusters 409a, 409b, and 409c in accordance with an example embodiment. In FIG. 4b, functions of a network server, such as the server system 310 in FIG. 3, can be distributed among three computing clusters 409a, 409b, and 408c. The computing cluster 409a can include one or more computing devices 400a, cluster storage arrays 410a, and cluster routers 411a, connected together by local cluster network 412a. Similarly, computing cluster 409b can include one or more computing devices 400b, cluster storage arrays 410b, and cluster routers 411b, connected together by local cluster network 412b. Likewise, computing cluster 409c can include one or more computing devices 400c, cluster storage arrays 410c, and cluster routers 411c, connected together by a local cluster network 412c.

In some embodiments, each of computing clusters 409a, 409b, and 409c can have an equal number of computing devices, an equal number of cluster storage arrays, and an equal number of cluster routers. In other embodiments, however, some or all of computing clusters 409a, 409b, and 409c can have different numbers of computing devices, different numbers of cluster storage arrays, and/or different numbers of cluster routers. The number of computing devices, cluster storage arrays, and cluster routers in each computing cluster can depend on the computing task or tasks assigned to each computing cluster.

Cluster storage arrays 410a, 410b, and 410c of computing clusters 409a, 409b, and 409c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

The cluster routers 411a, 411b, and 411c in the computing clusters 409a, 409b, and 409c can include networking equipment configured to provide internal and external communications for the computing clusters. For example, the cluster routers 411a in the computing cluster 409a can include one or more internet switching and/or routing devices configured to provide (i) local area network communications between the computing devices 400a and the cluster storage arrays 401a via the local cluster network 412a, and/or (ii) wide area network communications between the computing cluster 409a and the computing clusters 409b and 409c via the wide area network connection 413a to the network 406. The cluster routers 411b and 411c can include network equipment similar to the cluster routers 411a, and the cluster routers 411b and 411c can perform similar networking functions for the computing clusters 409b and 409b that the cluster routers 411a perform for the computing cluster 409a.

3. Using Hand Gestures for Interaction with a HMD

In accordance with example embodiments, hand gestures can be used to provide user input to a wearable HMD (or other wearable computing device), and in particular to identify or signify what may be considered or classified as important or worthy of attention or notice, for example. More specifically, a hand gesture can serve as a user interface of the HMD, providing functionality to visually select an item or object viewable with the wearable HMD, and then apply some action to, or carry out some action in relation to, an image of the visually-selected item or object.

Example embodiments herein include three specific hand gestures for visually selecting an object or item in the FOV of the HMD, or some viewable region within the FOV of the HMD, and then applying a respective, particular action to an image of the object or item (or of the selected region of the FOV). The three specific hand gestures are: a heart-shaped hand gesture, a right-angle-shaped hand gesture, and a closed-loop-shaped hand gesture. Each of the three specific hand gestures is described below, following a discussion first of embodiments of more general hand gesture recognition and related functionality as a user interface of a HMD.

In the discussion below, the example embodiments are described in terms of operation by considering example applications of the hand gestures with a HMD. For purposes of illustration, a HMD, such as the wearable computing device 100 of FIG. 1 may be taken as being worn by an example user. In the illustrative operation described below, the hand or hands that perform the example hand gestures are taken to be that or those of the example user of the HMD. It will be appreciated, however, that a user or wearer need not necessarily be invoked to understand all aspects of the example operation.

a. Detection of Hand Gestures

Figure 5:
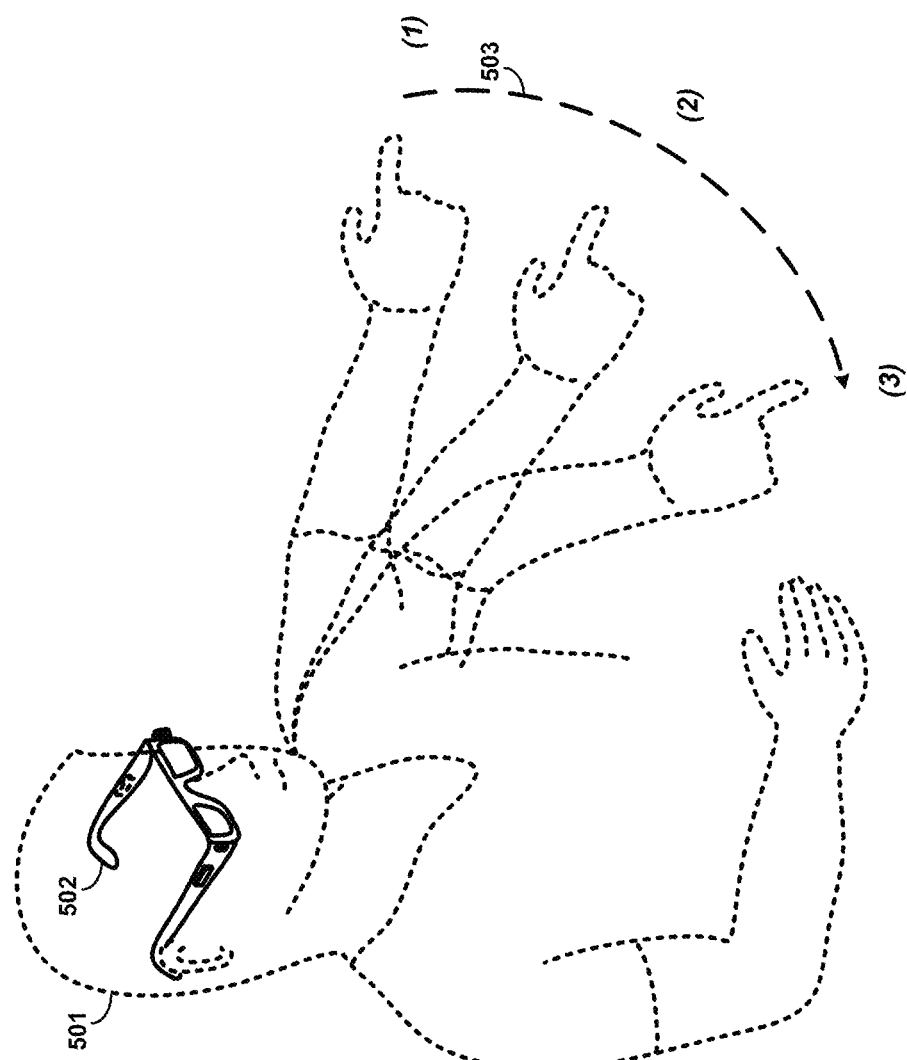
FIG. 5 illustrates an example wearable head-mounted display worn by a representation of an example user who is depicted as making an example hand gesture, according to an example embodiment.

FIG. 5 depicts the context for the illustrative description of operation of an example embodiment of a system and method for interaction with a HMD via hand gestures. As shown, an example user 501 is wearing a HMD 502. The example user 501 is depicted as making a gesture with his left hand. In the example shown, the hand gesture appears to include a sweeping motion (represented by a dash arc 503) of the example user's left arm, with the example user's left hand held in a pointing gesture during the represented motion. For purposes of illustration, three positions in the motion are shown, labeled "(1)," "(2)," and "(3)," with example user's left arm shown at each of the three positions. No particular meaning or interpretation of the example hand gesture is necessarily considered for the moment, although it could be imagined that the gesture corresponds, for example, to some type of cursor-like pointer gesture as viewed and interpreted by the HMD 502. For example, a cursor-like pointer gesture could be used to identify an object in the FOV of the HMD 502 that a wearer of the HMD wishes to signify as important or noteworthy, or to highlight or underline an object or text that appears in the FOV. However, this possible function (cursor-like pointer gesture) is an example, and not intended to be limiting with respect to the hand gesture illustrated in FIG. 5.

While the example hand gesture of FIG. 5 is taken to involve both a hand pose (e.g., pointing of the index finger) and motion, it will be appreciated that other hand gestures could involve just a hand pose, and others still could involve just hand motion. For example, a hand gesture could take the form of a fist, a fist with one or more fingers extended, or some other configuration hand and fingers. Except for any necessary motion or movement for a hand to assume the pose or configuration, the hand gesture itself might correspond to a static pose. A hand gesture could also involve more than one hand.

In accordance with an example embodiment, the HMD can recognize that a hand gesture is being or has been made, and may then identify or match the recognized hand gesture against a library (or other list or collection) of known hand gestures in order to determine one or more actions to take or invoke in response to the gesture. Thus, a user, such as the example user 501, can interact (e.g., provide input data and/or commands) with a HMD, such as the HMD 502, by performing or making a hand gesture in region of space viewable by the HMD. In practice, the viewable region of space for hand gestures of a user of a HMD can be a forward FOV of the HMD, within about an arm's length from the front (forward-facing side) of the HMD. The characterization of "an arm's length" in front of a HMD provides a useful example of a hand gesture space or region, but is not intended to limit the possible region of space around a wearable HMD in which hand gestures for interaction with the HMD could be used.

In further accordance with the example embodiment, the HMD 502 can recognize that a hand gesture is being or has been made by using a video camera (such as video camera 120 in FIG. 1, for example) to monitor the FOV for one or more triggering events or criteria. For example, the video camera could monitor the FOV for a particular marker, such as a ring bearing a known pattern, which could then be used to signal the presence of a user's hand within a spatial region designated for hand gestures (among other purposes). As another example, the video camera could monitor the FOV for the appearance of an object or item having a color or tone that matches or resembles one or more cataloged colors and/or tones considered to be representative of a variety of skin colors. Again, this could indicate the presence of a user's hand within a spatial region designated for hand gestures. It will be appreciated that other criteria or events could signal the presence of a user's hand, and trigger hand gesture analysis.

Upon determining that a triggering event has occurred, video data from the video camera could be analyzed for the presence and/or occurrence of a hand gesture. Considering a static hand gesture for purposes of illustration, the HMD could capture video data from the FOV of the video camera, and then identify a triggering object in the captured data. The HMD (e.g., a processor of the HMD) could next apply an analytical shape template to the triggering object or to a region containing the triggering object. More particularly, the analytical shape template could correspond to an adjustable graphical outline that can be algorithmically configured to fit around an identifiable form of the triggering object. Additionally or alternatively, the adjustable graphical outline of the analytical shape template could be configured to fit around a portion of the FOV that appears as bounded in some way by the triggering object. Once a sufficient fit to the form of the object is obtained, the adjusted analytical shape template may then be used as a sort of stand-in or proxy for the triggering object in a search for a match or near match against known shapes in a library (or other list or collection) of known hand gestures.

In further accordance with the example embodiment, a search for a matching (or nearly matching) shape could be carried out by comparing an analytical expression for the adjusted shape template with each of an analytically-expressed shape in library of known hand gestures, in which each known hand gesture is associated with a respective, analytically-expressed shape. Each comparison could take the form of a least-squares fitting procedure, for example, in order to identify a closest match. Other fitting procedures could be used as well. The search could test for a best match against all the known shapes in the library, or could proceed sequentially and terminate upon a first occurrence of match that exceeds some threshold statistical significance, for example. Once a match (or a best-fit match) is found, the hand gesture can then be considered as recognized by the HMD, and an associated action or actions carried out.

By way of example, a shape library could be stored in one or another form of memory of the HMD, and accessed by a processor of the HMD as part of the search for a matching shape. Each known shape in the hand gesture library could be stored with a corresponding gesture identifier, as well as one or more actions, programs, or applications that could be carried out or invoked upon matching the shape against a given, adjusted, analytical shape template of an observed (or detected) hand gesture. In practice, the adjustment of the shape template to an observed hand gesture, as well as the fitting procedure and the search for a match, could be implemented as one or more programs or applications, and executed by a processor of the HMD.

In accordance with the example embodiment, a hand gesture library could be stored in one or another form of memory of the HMD, and accessed by a processor of the HMD as part of the search for a matching shape. Each hand gesture of the library could be contained in a data structure record, for example, that includes a gesture identifier (e.g., a name or description), a respective analytically-expressed shape, and indicia of one or more actions, programs, or applications. The hand gesture library could include a collection of such records, each containing a different hand gesture and associated analytically-expressed shape. The library could thus be made up of a collection of such data structure records. Upon determining an adjusted, analytical shape template of an observed (or detected) hand gesture, the HMD 502 could do a table look-up or other form of search in the hand gesture library in order to identify a closest match with one of the stored analytically-expressed shapes. In this way, the observed hand gesture could be identified with a known, stored gesture identifier. The identified hand gesture could, in turn, be used to signal or trigger an associated action or application on the HMD 502, for example.

Accordingly, interaction with a HMD (or other wearable computing device) via hand gestures can be facilitated by creating and maintaining a library of hand gestures on an HMD. Moreover, the larger the library of hand gestures, the more expansive the scope and richness of a user interface of the HMD supported by hand gestures.

In accordance with the example embodiment, a library of hand gestures could be created by generating each hand gesture through a "learning" or recording process. More particularly, a wearable HMD could be placed into a recording mode during which a given, initially-undefined (or unassigned) hand gesture is made within a viewable region of space used for hand gestures. The given hand gesture could thereby be recorded in the form of an analytically-expressed shape, and an associated gesture identifier, as well as associated actions, could be assigned. The wearable HMD could then exit the recording mode. The newly-recorded hand gesture could thus be stored as an entry in the gesture library. This process could be repeated to increase the inventory of hand gestures in the library. Thereafter, the recorded hand gestures could be available for interaction as described above. Additionally or alternatively, all or part of a hand gesture library could be created externally to the wearable HMD, and loaded during system configuration or manufacture, for example.

In further accordance with the example embodiment, a hand gesture library stored on a HMD can include at least one alerting hand gesture, the purpose of which can be to signal the HMD to monitor for, or be "on the look-out" for, one or more subsequent, other hand gestures. The alerting hand gesture could be used, for example, to place the HMD in a mode or state in which it should expect one or more subsequent hand gestures. As a further example, an alerting hand gesture could be used by a user or wearer of the HMD to indicate that the HMD is observing the user's hand or hands, thereby helping avoid possible confusion with someone else's hands that might be observed by the HMD. Additionally or alternatively, an alerting hand gesture could support an authorization and/or authentication function, whereby the HMD might require detection of the alerting hand gesture before it will monitor for, or pay heed to, any subsequent hand gestures. For example, a user or wearer of an HMD could lock and unlock access to a hand gesture function of the HMD with an alerting hand gesture that included an authorization and/or authentication function.

In still further accordance with the example embodiment, an alerting hand gesture could be part of a default hand gesture library of a HMD. For example, such a default library could be installed on the HMD as part of a manufacture or configuration process. Additionally or alternatively, an alerting hand gesture could be added to a hand gesture library of a HMD by a user or wearer of the HMD. This could be considered as analogous to adding or changing a password, for example. A hand gesture library could include more than one alerting hand gesture, each having a different, specific purpose or function, for example.

b. Heart-Shaped Hand Gesture

In accordance with an example embodiment, a hand gesture of two hands forming a symbolic heart shape may be used to select a region of the FOV of a HMD that is bounded by the two hands. An image of the selected region may then be generated, and a particular action may be carried out or applied to the image.

Figure 6A:
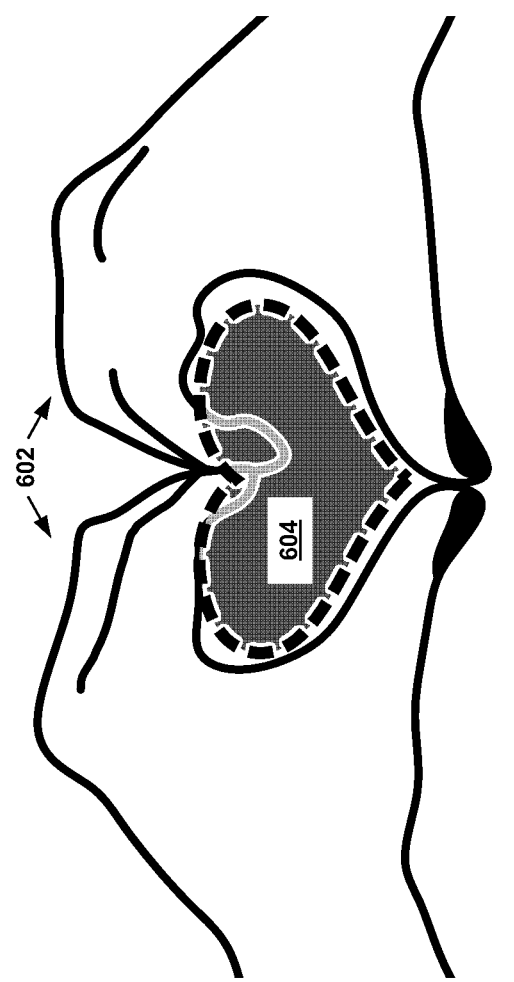
FIG. 6a is an illustration representing a hand gesture forming a symbolic heart shape, according to an example embodiment.

FIG. 6a illustrates an example heart-shaped hand gesture made by two hands 602. In the illustration, a shape resembling a symbolic heart 604 is formed with an area bounded at the top by the two index fingers and at the bottom by the two thumbs of the two hands 602. The term "symbolic heart" is used herein to refer to a heart shape similar to one that might be used to pictorially or iconographically express love or affection, for example. As such a symbolic heart may be distinguished (although it need not necessarily be) from an anatomical rendering of a heart. It will be appreciated that two hands (such as hands 602) could be configured differently than shown in FIG. 6a, and still form a heart-shaped gesture. For example, a heart-shaped gesture could assume a different orientation, or be formed by a different combination of fingers.

In accordance with the example embodiment, the symbolic heart shape 604 could be stored in a hand gesture library on a HMD, for example as an analytically-expressed shape, as described above. By determining that an adjusted, analytical shape template of an observed (or detected) hand gesture matches the symbolic heart shape 604 in the hand gesture library, the HMD could thereby determine that a heart-shaped hand gesture has been observed.

Also in accordance with the example embodiment, upon determining that it has observed or detected a heart-shaped hand gesture, the HMD will generate an image of a portion of the FOV bounded heart shape bounded by the two hands 602, and transmit a message with the image and an indication that the image is "liked" to a social network service. For example, a user or wearer of a HMD can use a heart-shaped hand gesture to visually select an object or item from within the FOV of the HMD, and instantly communicate to a social networking service that he/she "likes" the selected object or item.

More particularly, a social networking service could support a multitude of subscriber accounts, allowing subscribers to share information, data, content, and the like in a computer-implemented, virtual environment. A social networking service could be hosted on a server system, such as server system 310 of FIG. 3, for example. In a social networking context or venue supported by a social networking service, information indicating that a given subscriber "likes" something may be considered valuable or desirable to share with one or more other subscribers. Information about what individual subscribers "like" may also be valuable information to the social networking service itself for purposes of marketing, advertising, or providing targeted services to those individual subscribers. In view of a somewhat specialized and/or particularized meaning of the verb "to like" when applied in a social networking context and in the manner described above, the terms "like," "liked," "liking," "likes," and other verb forms appear within explicit quotation marks herein when they are being used to refer to the specialized/particularized social networking meaning.

In accordance with the example embodiment, a HMD, such as HMD 502, could communicate with a social networking service via an access network (such as RAN 304 or wireless access network 306) and a communication network (such as data network 302). In further accordance with the example embodiment, the HMD can include a subscriber identity together with the image and the indication that the image is "liked" in the message to the social networking service. Accordingly, the wearable HMD enables a user or wearer of the HMD to inform the social networking service that the identified subscriber "likes" the image selected via the heart-shaped gesture.

Moreover, since the image may correspond to items or objects viewable in the FOV of the HMD, the source material that is tagged as being "liked" can originate via direct observations of the user or wearer of the HMD. This may distinguish from a mode in which a subscriber to a social networking service indicates "liking" source material that originates from another subscriber and is discovered only via the social networking service. In example operation in which the user or wearer of the HMD is also the identified subscriber, the transmitted message may be considered as conveying to the social networking service an image that is "liked" by the user or wearer of the HMD.

FIGS. 6b and 6c illustrate use of a heart-shaped hand gesture in a FOV of a HMD. In FIG. 6b, a FOV 606 is represented as a rectangle with rounded corners. Two hands 602 are depicted as forming a heart-shaped hand gesture, which, by way of example, fills up most of the FOV. Also by way of example, a picture 603 of Mozart appears within the FOV 606; the picture could be part of a poster or a painting viewed in the FOV 606, for example. In the illustration, the heart-shaped hand gesture surrounds a portion of the picture 603. Upon determining that a heart-shaped hand gesture has been made, the HMD generates an image of the FOV bounded by the gesture. The generated image 608 is represented to the right side of FIG. 6b, with a zigzagging arrow indicating its having originated from the heart-shaped hand gesture in the FOV 606. Once the image is generated, the HMD could be transmitted it to a social networking service in a message that includes an indication an identity of a subscriber and an indication that the image is "liked," as described above. Note that the generated image 608 appears to include more of the picture 603 than is bounded by the heart-shaped hand gesture. This could result from intelligent interpretation of the contents of the display area in and around the strictly bounded area, for example.

In further accordance with the example embodiment, the social networking service could carry out a network-based information search based on the image received in the message and on the indication that the image is "liked" by the identified subscriber. The results of the search could then be returned to the HMD, and one or more aspects of the search results to could be displayed or presented at the HMD. Taking the generated image 608 of Mozart as an example, a network-based information search based on the image and an indication the identified subscriber "likes" the image (as well as possibly "liking" the subject of the image, namely Mozart) could return a result including information about a concert featuring the music of Mozart, for example. The information about the concert could then be displayed by the HMD for the user or wearer to see.

FIG. 6c again shows the two hands 602 forming a heart-shaped hand gesture that fills up most of the FOV 606. In this example, a picture 605 of an announcement or advertisement concert of Mozart's music appears within the FOV 606. Again for purposes of illustration, the heart-shaped hand gesture appears to surround a portion of the picture 605. Upon determining that a heart-shaped hand gesture has been made, the HMD generates an image of the FOV bounded by the gesture. The generated image 610 is represented to the right side of FIG. 6c, with a zigzagging arrow indicating its having originated from the heart-shaped hand gesture in the FOV 606. Once the image is generated, the HMD could be transmitted it to a social networking service in a message that includes an indication an identity of a subscriber and an indication that the image is "liked," as described above. Once again, the generated image 610 appears to include more of the picture 605 than is bounded by the heart-shaped hand gesture.

As with the example in FIG. 6b, the social networking service could invoke a network-based information search based on the generated image 610 and an indication that it is "liked" by the identified subscriber. The search result could include information about other concerts, pictures of Mozart, or a map to the concert hall, for example. Considering the examples of FIGS. 6a and 6b together, it could even be possible that the search result of one is the picture displayed in the FOV of the other. For example, as a result of the network-based information search based on the generated image 608 in FIG. 6b, the HMD could receive and display the picture 605 in FIG. 6c. The reverse situation could be possible as well.

c. Right-Angle-Shaped Hand Gesture

In accordance with an example embodiment, a hand gesture of a hand forming a symbolic right-angle shape may be used to select a region of the FOV of a HMD. An image of the selected region may then be generated, and a particular action may be carried out or applied to the image.

Figure 7:
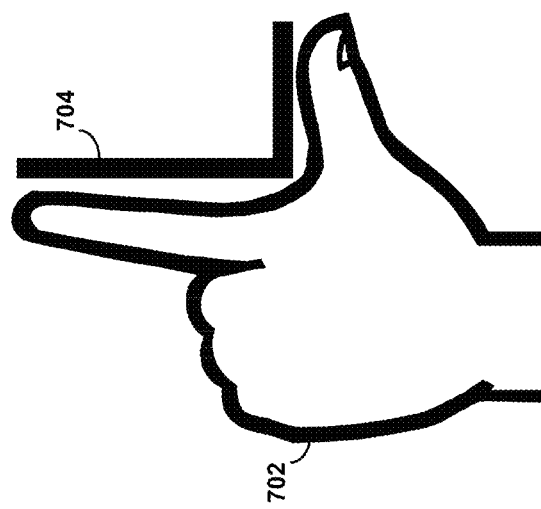
FIG. 7 is an illustration representing a hand gesture forming a symbolic right-angle shape, according to an example embodiment.

FIG. 7 illustrates an example right-angle-shaped hand gesture made by a hand 702. In the illustration, the thumb and index finger of the hand 702 form a symbolic right angle, which is shown as subtending a right angle 704. The term "symbolic right angle" is used herein since the actual shape formed by a hand, as illustrated by hand 702, is typically only an approximation of a right angle (represented by right angle 704). Note that for the purpose of illustration in the present discussion, the right-angle-shaped hand gesture is depicted as being made with a left hand. It will be appreciated that this gesture could also be made with a right hand. It will be also appreciated that the hand 702 could be oriented differently than shown in FIG. 7.

In accordance with the example embodiment, the right-angle shape 704 could be stored in a hand gesture library on a HMD, for example as an analytically-expressed shape, as described above. By determining that an adjusted, analytical shape template of an observed (or detected) hand gesture matches the right-angle shape 704 in the hand gesture library, the HMD could thereby determine that a right-angle-shaped hand gesture has been observed.

Note that a match to a right-handed right-angle-shaped hand gesture could be interpreted to have the same or similar meaning to a left-handed right-angle-shaped hand gesture. Alternatively, right-handed and left-handed matches could have different meanings. In the present discussion, no distinction will be made between the meanings of right-handed and left-handed right-angle-shaped gestures. However, this should not be taken as limiting or foreclosing on the possibility of right-handed and left-handed right-angle-shaped gestures having different meanings.

Also in accordance with the example embodiment, upon determining that it has observed or detected a right-angle-shaped hand gesture, the HMD will generate an image of a portion of the FOV defined or demarked by the symbolic right angle, and transmit a message with the image and a request to post the image online to a social network service. For example, a user or wearer of a HMD can use a right-angle-shaped hand gesture to visually select an object or item from within the FOV of the HMD, and instantly communicate to a social networking service a request to post the image. As with the example heart-shaped hand gesture described above, the HMD could communicate with a social networking service via an access network (such as RAN 304 or wireless access network 306) and a communication network (such as data network 302).

In further accordance with the example embodiment, the HMD can include a subscriber identity together with the image and the request to post the image in the message to the social networking service. Accordingly, the wearable HMD enables a user or wearer of the HMD to request the social networking service to post the image in association with an account of the identified subscriber via the right-angle-shaped gesture.

Figure 8A:
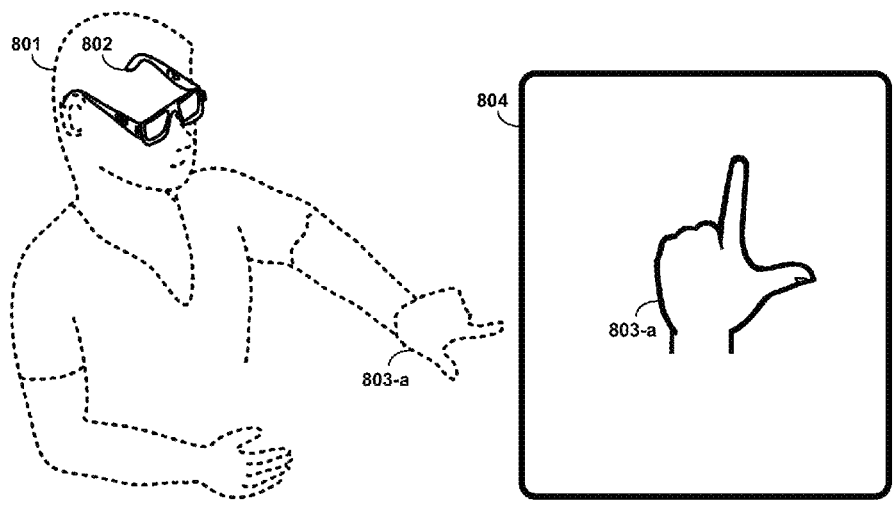
FIG. 8a illustrates an example wearable head-mounted display worn by a representation of an example user who is depicted as making right-angle-shaped hand gesture at a relatively far distance from the example wearable head-mounted display, according to an example embodiment.

FIGS. 8a and 8b and FIGS. 9a and 9b illustrate one mode use of a right-angle-shaped gesture in a FOV of a HMD. In FIG. 8a, an example user 801 is depicted as wearing a HMD 802 and making a right-angle hand gesture with his left hand 803-a. By way of example, the example user's left arm is outstretched, so that his left hand 803-a is approximately as far from his face (and the HMD 802) as possible. A depiction of the example user's left hand 803-a as viewed in the FOV 804 of the HMD 802 is shown to the right side of FIG. 8a. At the relatively far distance from the front of the HMD 802, the example user's left hand 803-a appears relatively small, covering only a small portion of the FOV 804. Accordingly, a symbolic right angle would also appear relatively small in the FOV 804 in FIG. 8a.

Figure 8B:
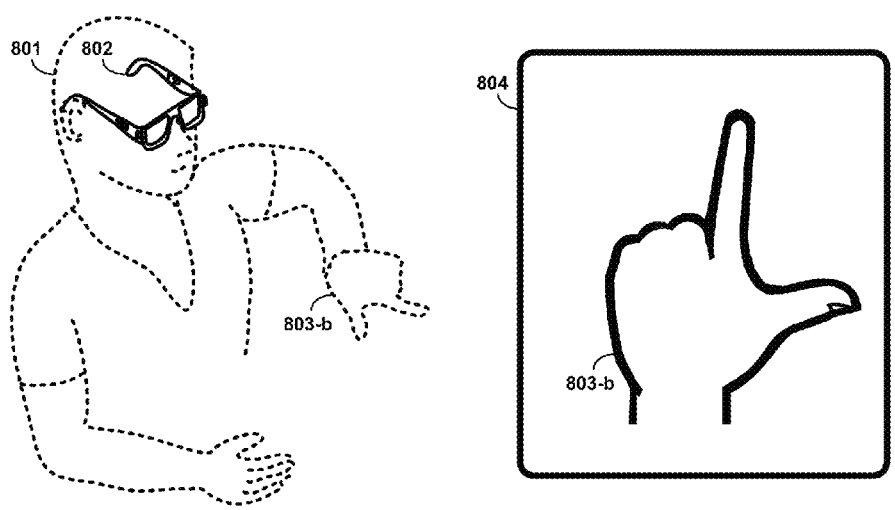
FIG. 8b illustrates an example wearable head-mounted display worn by a representation of an example user who is depicted as making right-angle-shaped hand gesture at a relatively near distance from the example wearable head-mounted display, according to an example embodiment.

In FIG. 8b, the example user 801 is again depicted as wearing the HMD 802 and making a right-angle hand gesture with his left hand 803-b. However, in this instance (and again by way of example) the example user 801 is holding left hand 803-b close in, so that his left hand 803-b is relatively near to his face (and to the HMD 802). A depiction of the example user's left hand 803-b as this time viewed in the FOV 804 of the HMD 802 is shown to the right side of FIG. 8b. At the relatively near distance from the front of the HMD 802, the example user's left hand 803-b appears relatively large, covering a large portion of the FOV 804. Accordingly, a symbolic right angle would also appear relatively large in the FOV 804 in FIG. 8b.

Figure 9A:
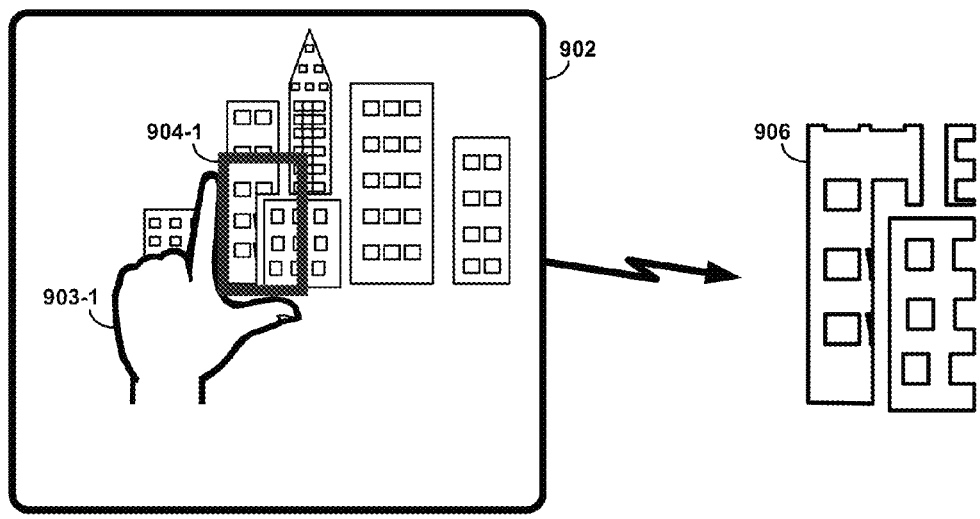
FIG. 9a is an illustration of using a right-angle-shaped hand gesture as viewed at a relatively far distance in a field of view to select an image area of a display, according to an example embodiment.
Figure 9B:
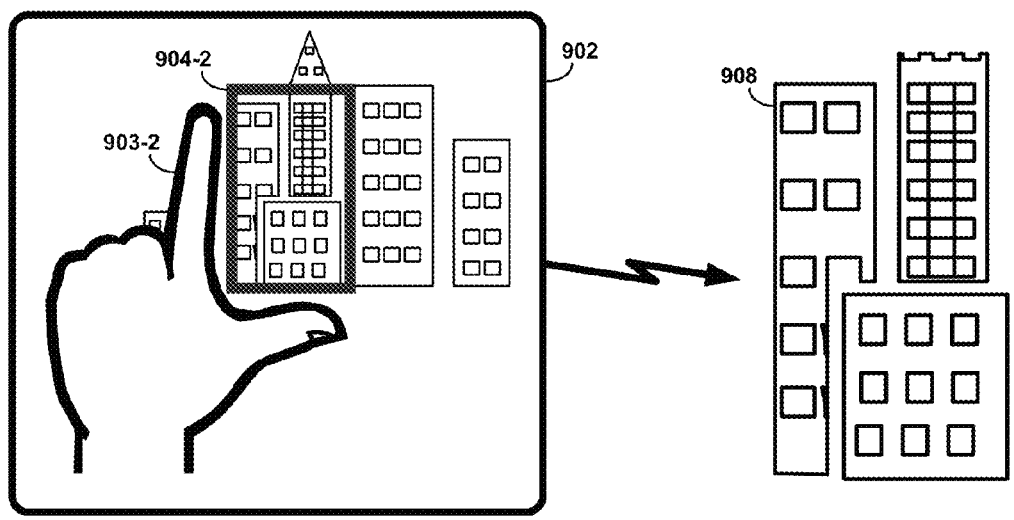
FIG. 9b is an illustration of using a right-angle-shaped hand gesture as viewed at a relatively near distance in a field of view to select an image area of a display, according to an example embodiment.

FIGS. 9a and 9b illustrate how the apparent size of a symbolic right angle the FOV of a HMD can be used to define or demark a portion of the FOV for image selection. Each of FIGS. 9a and 9b depict a city skyline being viewed within a FOV 902. In FIG. 9a, a hand 903-1 is shown as making a right-angle gesture within the FOV 902. This view corresponds to the example illustrated in FIG. 8a, so that the hand 903-1 appears relatively small in the FOV 902. Accordingly, a symbolic right angle appears to subtend a relatively small bounding box 904-1 in the FOV 902. The bounding box 904-1 correspondingly encloses a relatively small portion of the example skyline viewed in the FOV 902.

Upon determining that a right-angle-shaped hand gesture has been made, the HMD generates an image of the FOV within the bounding box 904-1. The generated image 906 is represented to the right side of FIG. 9a, with a zigzagging arrow indicating its having originated from the right-angle-shaped hand gesture in the FOV 902. Once the image is generated, the HMD could be transmitted it to a social networking service in a message that includes an indication an identity of a subscriber and a request to post the image, as described above.

In FIG. 9b, a hand 903-2 is again shown as making a right-angle gesture within the FOV 902, but this time the view corresponds to the example illustrated in FIG. 8b, so that the hand 903-2 appears relatively large in the FOV 902. Accordingly, a symbolic right angle appears to subtend a relatively large bounding box 904-2 in the FOV 902. The bounding box 904-2 correspondingly encloses a relatively large portion of the example skyline viewed in the FOV 902.

Again upon determining that a right-angle-shaped hand gesture has been made, the HMD generates an image of the FOV within the bounding box 904-2. The generated image 908 is represented to the right side of FIG. 9b, the zigzagging arrow again indicating its having originated from the right-angle-shaped hand gesture in the FOV 902. Once more, the HMD could transmit the image 908 to a social networking service in a message that includes an indication an identity of a subscriber and a request to post the image, as described above.

The sizes of the images 906 and 908 differ by virtue of the different apparent sizes of the symbolic right angles formed by the hands 904-1 and 904-2 in FIGS. 9a and 9b. In accordance with the example embodiment, then, the size of an image selected using a right-angle-shaped hand gesture could be adjusted by moving the hand back and forth along the line of sight.

Figure 10A:
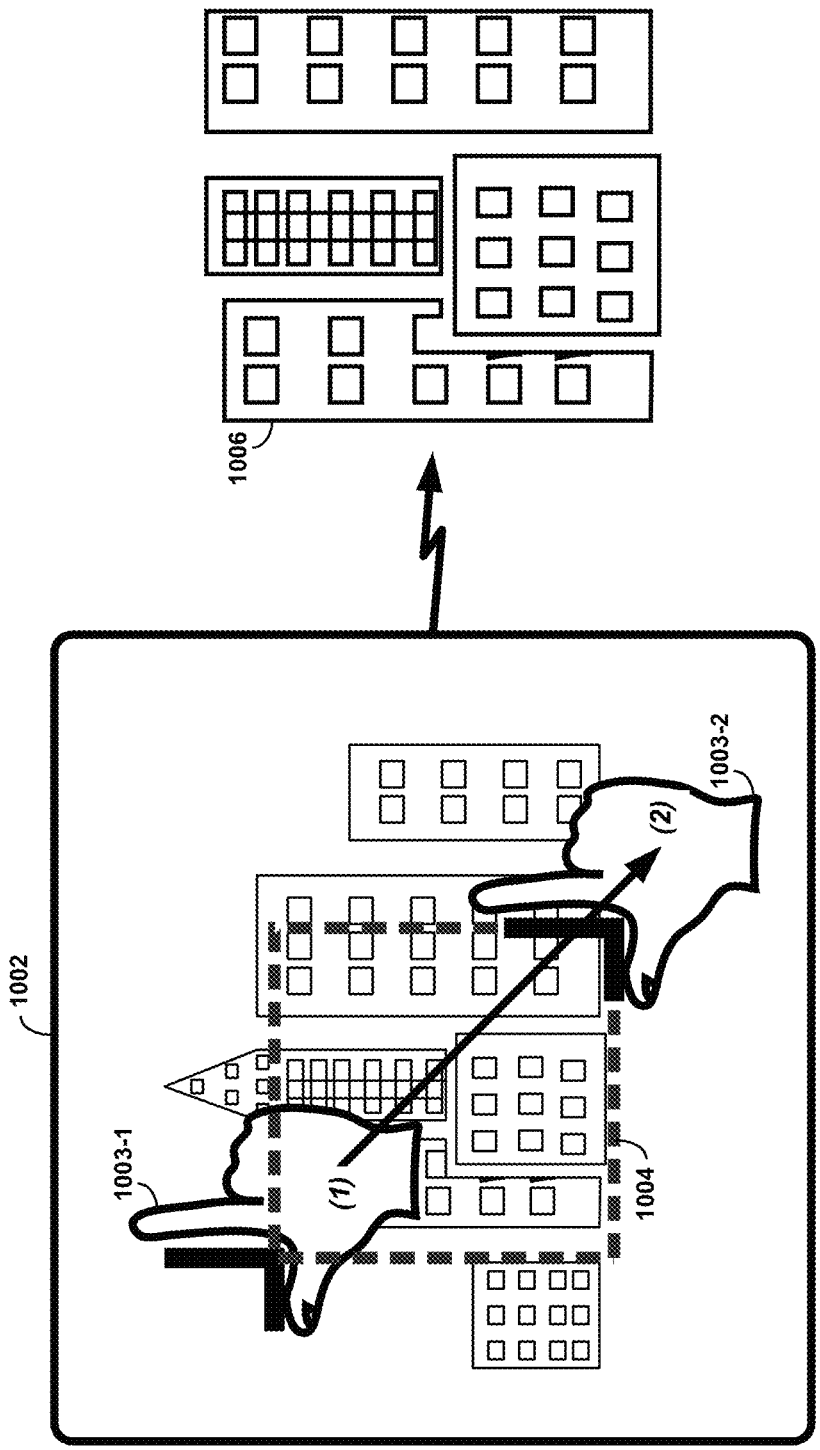
FIG. 10a is an illustrative representation of dragging a right-angle-shaped hand gesture in a field of view to select an image area of a display, according to an example embodiment.
Figure 10B:
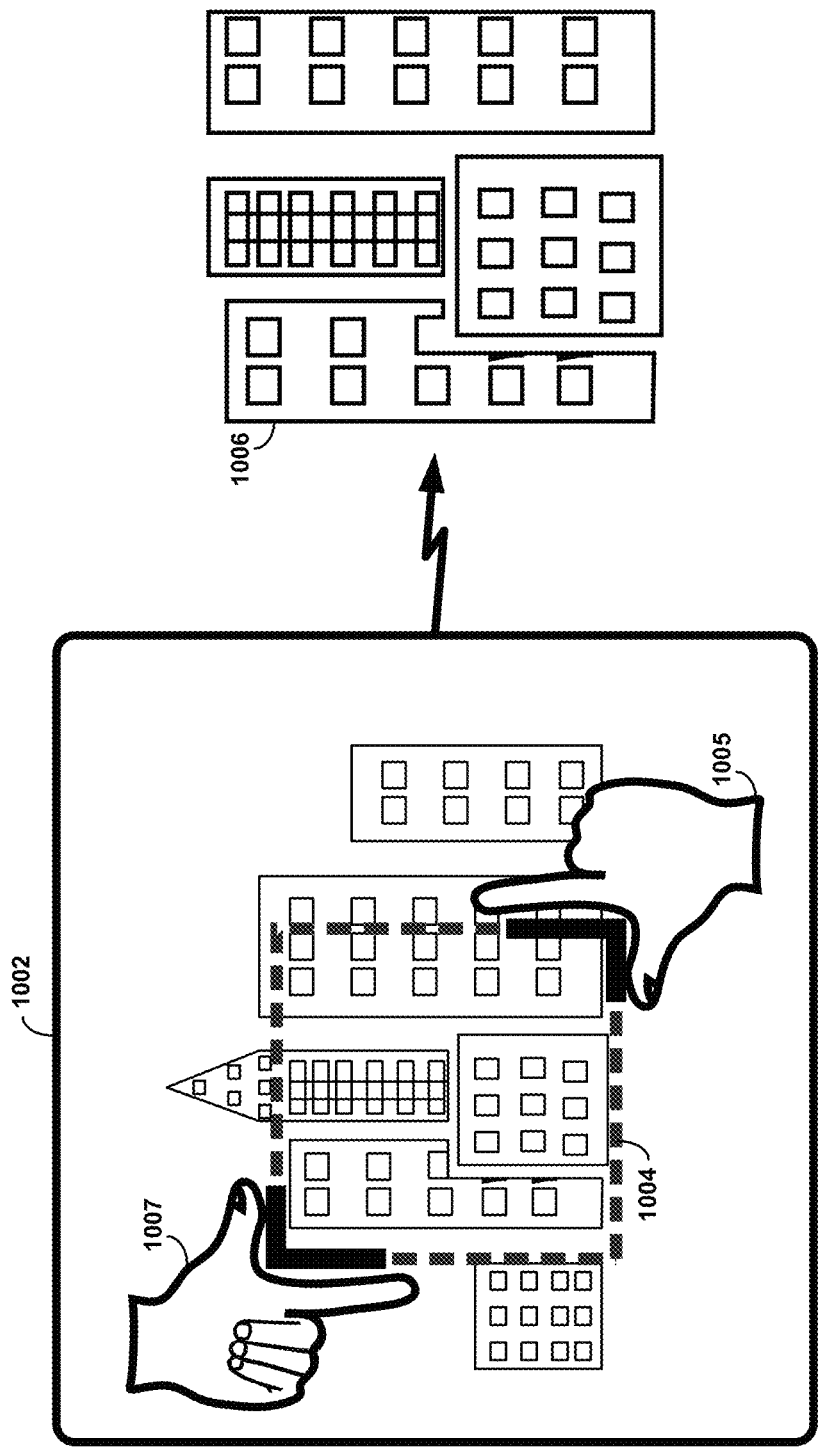
FIG. 10b is an illustrative representation of using a two-handed, right-angle-shaped hand gesture in a field of view to select an image area of a display, according to an example embodiment.

FIGS. 10a and 10b illustrate another mode of use of a right-angle-shaped gesture that involves dragging a symbolic right angle across the FOV of a HMD. In FIG. 10a, a city skyline is again depicted within a FOV 1002. A right-angle hand gesture is represented as being dragged from a first position (labeled "(1)") in the upper left of the FOV 1002, to a second position (labeled "(2)") in the lower right of the FOV 1002. The hand is labeled 1003-1 in the first position and 1003-2 in the second; an arrow pointing from the first position to the second represents the dragging motion. In accordance with the example embodiment, the dragging motion can generate a bounding box 1004 having diagonally opposite corners at the respective vertices of the symbolic right angles at the first and second positions.

Upon determining that a right-angle-shaped hand gesture has been made and has been dragged from a first to a second location in the FOV, the HMD generates bounding box having diagonally opposite corners at the respective vertices of the symbolic right angles the first and second locations, and then generates an image of the FOV within the bounding box. Note that this mode of use of a right-angle-shaped hand gesture corresponds to a hand gesture that includes both a hand pose (i.e., the symbolic right angle) and motion (e.g., dragging). The generated image 1006 is represented to the right side of FIG. 10a, with a zigzagging arrow indicating its having originated from the dragged, right-angle-shaped hand gesture in the FOV 1002. Once the image is generated, the HMD could be transmitted it to a social networking service in a message that includes an indication an identity of a subscriber and a request to post the image, as described above.

FIG. 10b illustrates a two-handed version of a right-angle hand gesture. The same city skyline shown in FIG. 10a is again depicted within a FOV 1002. In the two-handed version, a left hand 1007 is shown to be making an inverted right-angle hand gesture in the upper left of the FOV 1002, and a right hand 1005 is shown to be making an upward right-angle hand gesture in the lower right of the FOV 1002. As shown, the two right-angles form diagonally opposite corners of a bounding box 1004. The size of the bounding box 1004 could be adjusted by adjusting the distance between the two hands 1005 and 1007, and or by adjusting the distance of the two hands from the HMD (e.g., as explained in connection with FIGS. 8a, 8b, 9a, and 9b). As with the example of FIG. 10a, the HMD can generate an image 1006 of the FOV within the bounding box, again represented to the right side of FIG. 10b, and could transmit the image to a social networking service in a message that includes an indication an identity of a subscriber and a request to post the image, as described above.

In further accordance with the example embodiment, the social networking service could carry out a network-based information search based on the image received in the message. The results of the search could then be returned to the HMD, and one or more aspects of the search results to could be displayed or presented at the HMD.

d. Closed-Loop-Shaped Hand Gesture

In accordance with an example embodiment, a hand gesture of a hand forming a closed-loop shape may be used to select a region of the FOV of a HMD. An image of the selected region may then be generated, and a particular action may be carried out or applied to the image.

Figure 11:
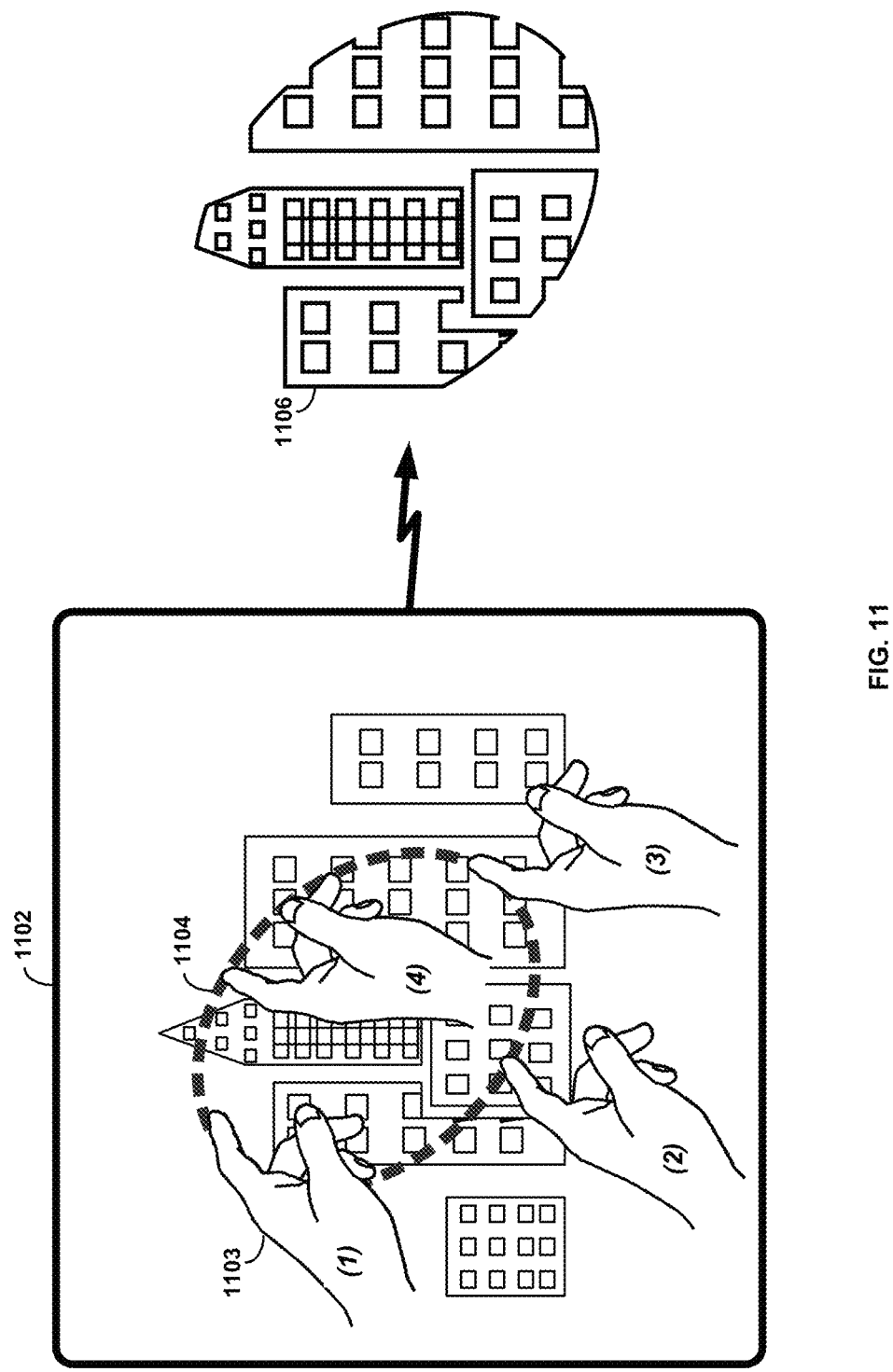
FIG. 11 is an illustrative representation of forming a closed-loop-shaped hand gesture in a field of view to select an image area of a display, according to an example embodiment.

FIG. 11 illustrates an example closed-loop-shaped hand gesture made by a hand 1103. In FIG. 11, a city skyline is again depicted within a FOV 1102. A hand 1103 holding a pointing posture (e.g., point with its index finger) is represented as moving in a looping motion. For purposes of illustration, the hand 1103 is depicted at four positions (labeled "(1)," "(2)," "(3)," and "(4),") FOV 1102. The representative hand motion is shown as tracing a closed loop 1104, which can generated by the HMD through analysis and interpretation of the pointing pose and its looping motion in the FOV 1102.

In accordance with the example embodiment, upon determining that a closed-loop-shaped hand gesture has been made, the HMD generates closed loop, and then generates an image of the FOV within the closed loop. Note that a closed-loop-shaped hand gesture corresponds to a hand gesture that includes both a hand pose (i.e., the point posture) and motion (e.g., looping). The generated image 1106 is represented to the right side of FIG. 11, with a zigzagging arrow indicating its having originated from the dragged, closed-loop-shaped hand gesture in the FOV 1102. Once the image is generated, the HMD could be transmitted it to a social networking service in a message that includes an indication an identity of a subscriber and a request to post the image, as described above in connection with the right-angle-shaped hand gesture.

In further accordance with the example embodiment, the social networking service could carry out a network-based information search based on the image received in the message. The results of the search could then be returned to the HMD, and one or more aspects of the search results to could be displayed or presented at the HMD.

4. Example Methods

The example embodiments for using hand gestures for interaction with a HMD described above in operational terms of can be implemented as methods on a wearable HMD. Each of three example embodiments is described below in terms of a flowchart illustrating an example a method in a wearable computing system, such as a wearable HMD, for using a respective one of the three particular hand gestures described operationally above. The illustrated steps of each flowchart could be implemented in the wearable head-mounted display as executable instructions stored in one or another form of memory, and executed by one or more processors of the wearable head-mounted display. Examples of a wearable HMD include the wearable computing system 100 in FIG. 1 and the wearable computing system 202 in FIG. 2. The executable instructions could also be stored on some form of non-transitory tangible computer readable storage medium, such as magnetic or optical disk, or the like, and provided for transfer to the wearable head-mounted display's memory during configuration or other procedure(s) for preparing the wearable head-mounted display for operation.

a. Heart-Shaped Hand Gesture

Figure 12:
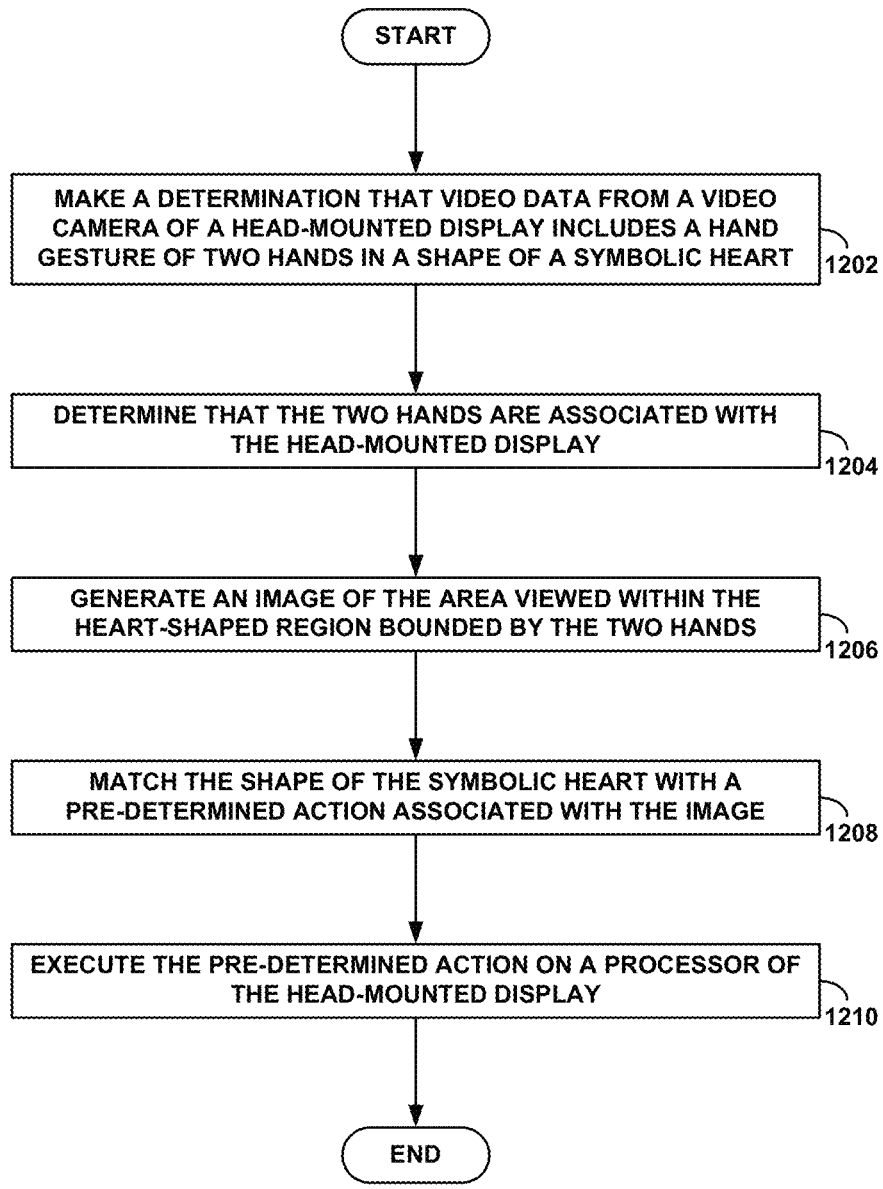
FIG. 12 is a flowchart illustrating an example embodiment of a heart-shaped hand gesture method in a wearable computing device.

FIG. 12 is a flowchart illustrating an example embodiment of a method in a wearable computing system, such as a wearable HMD, for using a heart-shaped hand gesture to convey user input.

As shown in FIG. 12, at step 1202 the wearable HMD makes a determination that video data from a video camera of the wearable HMD includes a hand gesture of two hands in the shape of a symbolic heart. In accordance with the example embodiment, the hand gesture would correspond to a heart-shaped area bounded by the two hands. As discussed above, an example of such a hand gesture is illustrated in FIG. 6a.

It will be appreciated that the two hands of such a heart-shaped gesture might not necessarily appear to form a strictly closed boundary. For instance, referring again to the representation in FIG. 6a, it could be possible that the two thumbs or the two index fingers in the illustration might not quite touch, for example. However, the heart-shaped area formed by the two hands could still be considered as effectively bounded (e.g., by interpolating any small gap or opening in an otherwise closed, heart-shaped boundary formed by the two hands). A similar potential absence of a strictly closed boundary could apply to other instances of a heart-shaped hand gesture, which could nevertheless be considered as effectively surrounding a closed area.

At step 1204, the wearable HMD determines that the two hands are associated with the wearable HMD. More particularly, the wearable HMD may analyze the video data that includes the hand gesture in order to determine that the hands are associated with the wearable HMD. For example, the wearable HMD could determine that one or more properties and/or characteristic of one or both of the two hands satisfy one or more criteria for identifying the two hands as those of a user or wearer of the wearable HMD.

Next, at step 1206 the wearable HMD generates an image that includes the area bounded by the two hands. The image may be generated, for example, by determining a set of image pixels of the video camera that correspond to the bounded area formed by the heart-shaped hand gesture, and then capturing the image data from those pixels. Examples of images captured within a heart-shaped hand gesture are depicted in FIGS. 6b and 6c, as discussed above. A determination of which pixels fall within the bounded area need not necessarily be precise. For example, the set of pixels could also include some pixels that might fall outside but close to the closed area, as well.

At step 1208, the shape of the symbolic heart is matched with a predetermined action associated with the image. In accordance with the example embodiment, the matching step identifies the predetermined action, which is then associated with the image by virtue of the image having been generated from the area bounded by the heart-shaped hand gesture. For example, the symbolic heart shape can be used to distinguish the predetermined action from a list or table of other possible actions. The same predetermined action could also be associated with another image generated from another instance of forming a heart-shaped hand gesture.

Finally, at step 1210 the predetermined action is carried out by the wearable HMD. More specifically, the predetermined action is executed by a processor of the wearable HMD. In doing so, the predetermined action is applied to the image generated from the area bounded by the heart-shaped hand gesture. Again, the same predetermined action could be applied to another image generated from another instance of forming a heart-shaped hand gesture.

In accordance with the example embodiment, a determination that the two hands are associated with the wearable HMD could be made by detecting a particular marking on at least one of the two hands, and then matching the particular marking with a predetermined identifier associated with the wearable HMD. For instance, a ring with a particular marking might be worn on one of the hands, and the marking could be detected by the wearable HMD (e.g., a camera of the HMD). Alternatively or additionally, HMD could determine that a particular hand gesture made by at least one of the two hands matches a predetermined identifying hand gesture associated with the wearable HMD. For example, the HMD could analyze the video data to determine that one of the hands made a hand gesture used to convey that the hand is that of a user or wearer of the wearable HDM. In further accordance with the example embodiment, such a particular marking and/or identifying hand gesture could be made as a sort of prelude to subsequent hand gestures, including the heart-shaped hand gesture, as a way to signal the wearable HMD to "pay attention" to such subsequent hand gestures as being ones made by the user or wearer of the wearable HMD.

In accordance with the example embodiment, the predetermined action could include determining a qualitative ranking for the image based on the hand gesture being a heart-shaped gesture, and then storing a data structure containing information associating the image together with the qualitative ranking. More particularly, assuming that two hands making the heart-shape gesture are those of a user or wearer of the wearable HMD, the heart-shaped gesture could be used to signify or express that the user or wearer "likes" some aspect of the FOV contained (or at least partially contained) within the area bounded by the heart-shaped gesture. The term "likes" may be considered as carrying or conveying a subjective disposition of the wearer or user that corresponds to the qualitative ranking of the image.

For example, the heart-shaped gesture might bound an area of the FOV that includes a view of the Golden Gate Bridge, and the image then generated would be an image of the bridge. Having recognized the heart-shaped gesture as picking out the bounded area used to generate the image, the HMD could assign or associate with the image a qualitative ranking of being "liked," and could thereby provide a means for the user to signify she or he "likes" the subject of the image (the Golden Gate Bridge in this example). The image and the qualitative ranking of being "liked" could then be stored together in one or another form of memory of the wearable HMD, for example.

Also in accordance with the example embodiment, the predetermined action could include generating a message containing both the image and information indicative of a qualitative ranking of the image, and then transmitting the message to a network server in a network communicatively coupled with the wearable HMD. Again, the qualitative ranking could correspond to the subject of the image being "liked" by a user or wearer of the wearable HMD, and could be based on the gesture being a heart-shaped hand gesture. By transmitting the message to the network server, the wearable HMD could thereby provide a means for the user to convey his or her "like" of the image (and/or the subject of the image) to the server. The server may then acquire information indicative of the user's "like" with respect to the image, and may subsequently apply or use this information in one or another application running on the server and/or application in communication with the server.

In further accordance with the example embodiment, the generated message could include an indication that the image is "liked," together with information associating an identified subscriber account in a social networking service. The generated message could then be transmitted to the social networking service, thereby providing the social networking service with information indicating that the identified subscriber "likes" the image (or the subject of the image, for example). By way of example, the message could be transmitted to a network address of a server or server system at which the networking service is hosted (e.g., a server or server system at which one or more programs and/or applications operate to provide a computer-implemented social networking service).

In further accordance with the example embodiment, the wearable HMD could receive a response from the social networking service containing a result (or information therefrom) of a network-based information search carried out based on the identified subscriber's "like" of the image. For example, the social networking service (or, e.g., an application that is part of or associated with the service) could invoke a network-based information search in which the image is the subject or topic of the search. The search and/or the information gained from it could be further refined by applying the information indicating the identified subscriber "likes" the image (or the subject of the image, for example). Upon receiving the response from the social networking service with the search result, the wearable HMD could then display some aspect of the result.

In further accordance with the example embodiment, the wearable HMD could transmit a log-in message to the social networking service in order to convey a request by the identified subscriber to login to his/her subscriber account. For example, assuming again that the user of the wearable HMD is the identified subscriber, the login message could provide a way for the user to login to the subscriber account at the social networking service, and thereby access those services available to logged-in subscribers. The log-in message (and resulting log-in action) could be necessary to allow the user to subsequently transmit "liked" images via the heart-shaped hand gesture, for example. Alternatively, a log-in message with a log-in request could be part of a message carrying a "liked" image. Other uses of a log-in message can be devised, as well.

Also in accordance with the example embodiment, the predetermined action could include generating a message containing both the image and a request for a network-based information search based on the image, and then transmitting the message to a network server in a network communicatively coupled with the wearable HMD. In this case, a request for a network-based information search based on the image can be made explicitly by the wearable HMD to a network-based information search service, for example. As with the search described above as being carried out implicitly by the social networking service, an explicit request for a search could result in a response with a search result from a server. The server could invoke a network-based information search in which the image is the subject or topic of the search, and return the search results in a response to the wearable HMD. Upon receiving the response, the wearable HMD could then display some aspect of the result. An example similar to the one described above for the implicit search could apply to the explicitly-requested search as well.

It will be appreciated that the steps shown in FIG. 12 are meant to illustrate operation of an example embodiment. As such, various steps could be altered or modified, the ordering of certain steps could be changed, and additional steps could be added, while still achieving the overall desired operation.

b. Right-Angle-Shaped Hand Gesture

Figure 13:
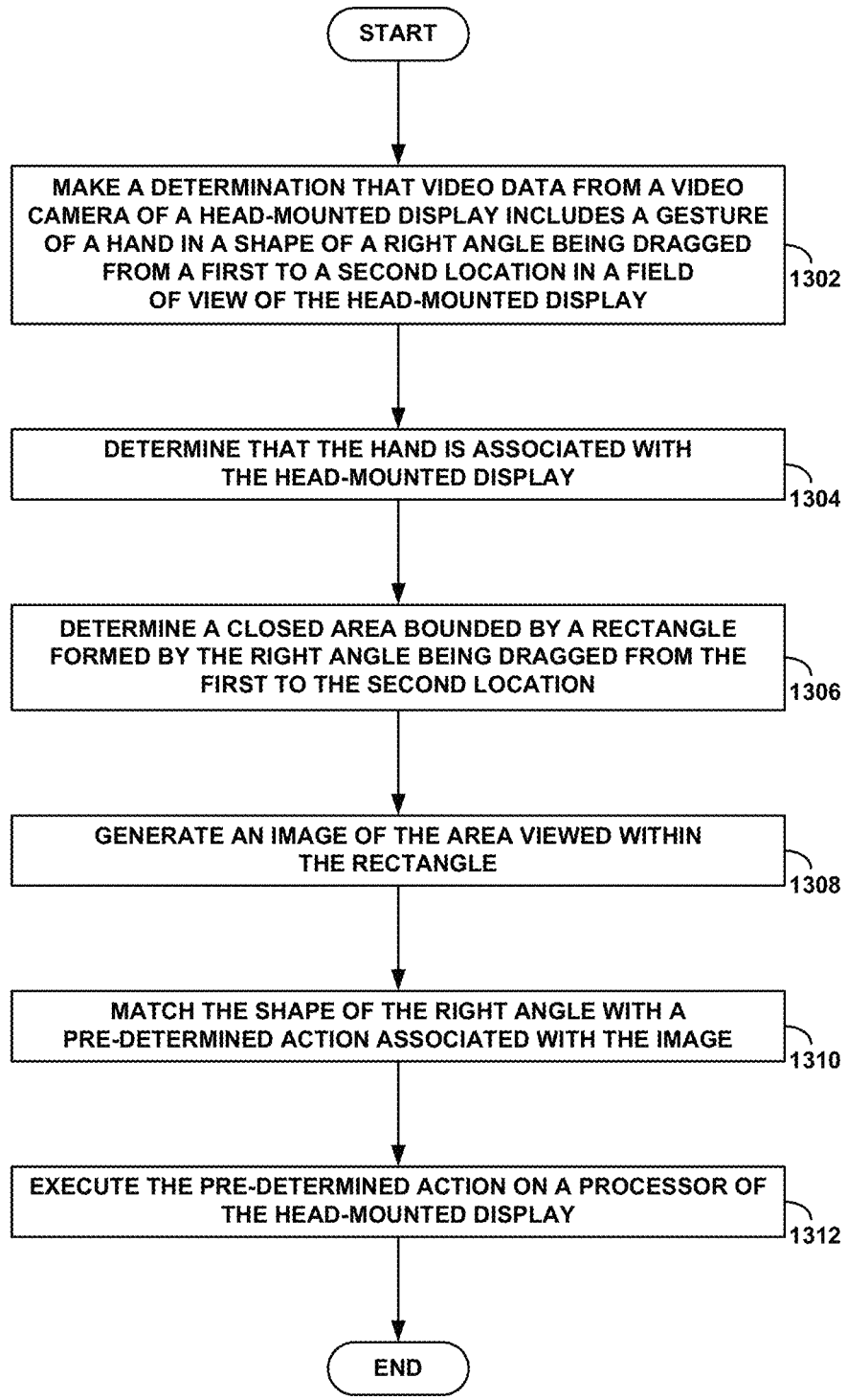
FIG. 13 is a flowchart illustrating an example embodiment of a right-angle-shaped hand gesture method in a wearable computing device.

FIG. 13 is a flowchart illustrating an example embodiment of a method in a wearable computing system, such as a wearable HMD, for using a right-angle-shaped hand gesture to convey user input.

As shown in FIG. 13, at step 1302 the wearable HMD makes a determination that video data from a video camera of the wearable HMD includes a hand gesture of a thumb and forefinger of a particular hand forming a shape of a symbolic right angle moving from a first location to a second location in FOV of the wearable HMD. In accordance with the example embodiment, the hand gesture would correspond to formation of a rectangular-shaped area. As discussed above, an example of such a right-angle hand gesture is illustrated in FIG. 7, and a representation of a hand gesture of symbolic right angle moving from a first location to a second location in a FOV is illustrated in FIG. 10.

At step 1304, the wearable HMD determines that the hand is associated with the wearable HMD. As with the step 1204 of the example method of FIG. 12, the wearable HMD may analyze the video data that includes the hand gesture in order to determine that the hand is associated with the wearable HMD. For example, the wearable HMD could determine that one or more properties and/or characteristic of the hand satisfies one or more criteria for identifying the hand as that of a user or wearer of the wearable HMD.

Next, at step 1306, the wearable HMD determines a closed area in the FOV bounded by a rectangle having a first corner at a vertex of the symbolic right angle at the first location and a diagonally-opposite second corner at a vertex of the symbolic right angle at the second location. The bounded area may be considered as being form by a motion of dragging the vertex from the first corner to the second corner. Again, this is illustrated in FIG. 10, which depicts the closed area as the dotted rectangle 1004.

At step 1308, the wearable HMD generates an image from the video data of a sub-FOV within the closed area determined at step 1306. As with the step 1206 of the example method of FIG. 12, the image may be generated, for example, by determining pixels of the video camera that correspond to the bounded area the closed area, and then capturing the image data from those pixels. Referring again to FIG. 10, an example is illustrated by the generated image 1006 corresponding to the bounded rectangle 1004 in the figure.

Next, at step 1310 the shape of the symbolic right angle is matched with a predetermined action associated with the image. As with the step 1208 of the example method of FIG. 12, the matching step identifies the predetermined action, which is then associated with the image by virtue of the image having been generated from the area bounded, in this case, by the rectangle. For example, the symbolic right angle can be used to distinguish the predetermined action from a list or table of other possible actions. The same predetermined action could also be associated with another image generated from another instance of forming a right-angle-shaped hand gesture.

Finally, at step 1312 the predetermined action is carried out by the wearable HMD. As with the step 1210 of the example method of FIG. 12, the predetermined action is executed by a processor of the wearable HMD. In doing so, the predetermined action is applied to the image generated from the area bounded by the right-angle-shaped hand gesture. Again, the same predetermined action could be applied to another image generated from another instance of forming a right-angle-shaped hand gesture.

In accordance with the example embodiment, a determination that the particular hand is associated with the wearable HMD could be made by detecting a particular marking on the particular hand, and then matching the particular marking with a predetermined identifier associated with the wearable HMD, in a similar manner to that described above in connection with the heart-shaped hand gesture. Also in similarity with the description above, the HMD could determine that a particular hand gesture made by the particular hand matches a predetermined identifying hand gesture associated with the wearable HMD.

Also in accordance with the example embodiment, the predetermined action could include storing the image in one or another form of memory of the wearable HMD. For example, a user of the wearable HMD could generate a photo album through repeatedly invoking the right-angle-shaped hand gesture to create images from the FOV of the wearable HMD.

In accordance with the example embodiment, the predetermined action could include generating a message containing the image, and then transmitting the message to a network server in a network communicatively coupled with the wearable HMD. For example, a user of the wearable HMD could generate and upload an image to a server in this manner.

In further accordance with the example embodiment, the generated message could include information associating an identified subscriber account in a social networking service. The generated message could then be transmitted to the social networking service. As described above by way of example, the message could be transmitted to a network address of a server or server system at which the networking service is hosted. The social networking service could then post the image online in association with the identified subscriber's account, for example. Other subscribers (e.g., those with privileges for viewing online postings associated with the identified subscriber's account) could subsequently view the posted image.

Assuming again that the user or wearer of the wearable HMD is the identified subscriber, the right-angle-shaped hand gesture can be used to nearly instantly generate, upload, and post a photographic image to a social networking service, wherein the image can be one or more subjects, items, or visually-identifiable topics in the FOV of the wearable HMD. In so doing, the wearable HMD can extend the means by which it enables the user or wearer the HMD to become a direct, real-time, experience-based origin or source of social networking information.

In further accordance with the example embodiment, the wearable HMD could receive a response from the social networking service containing a result (or information therefrom) of a network-based information search carried out based on the transmitted image. Again as described above, the social networking service could invoke a network-based information search in which the image is the subject or topic of the search. Upon receiving the response from the social networking service with the search result, the wearable HMD could then display some aspect of the result. The example described above involving discovery of a live music concert based on a network-based search of an image of a musician could apply to an image generated from a right-angle-shaped hand gesture, as well.

Also in accordance with example embodiment, a log-in message with a log-in request to a social networking service could be transmitted by the wearable HMD as part of the communications between the HMD and the social networking service, as described above. A log-in request could be used to enable the wearable HMD to access to the identified subscriber's account, for example.

In accordance with the example embodiment, the predetermined action could include generating a message containing both the image from the right-angle-shaped hand gesture and a request for a network-based information search based on the image, and then transmitting the message to a network server in a network communicatively coupled with the wearable HMD. As described above in connection with the heart-shaped hand gesture, the server could invoke such an explicitly-requested network-based information search based the image is the subject or topic of the search, and return the search results in a response to the wearable HMD. Again, upon receiving the response, the wearable HMD could then display some aspect of the result.

It will be appreciated that the steps shown in FIG. 13 are meant to illustrate operation of an example embodiment. As such, various steps could be altered or modified, the ordering of certain steps could be changed, and additional steps could be added, while still achieving the overall desired operation.

c. Closed-Loop-Shaped Hand Gesture

Figure 14:
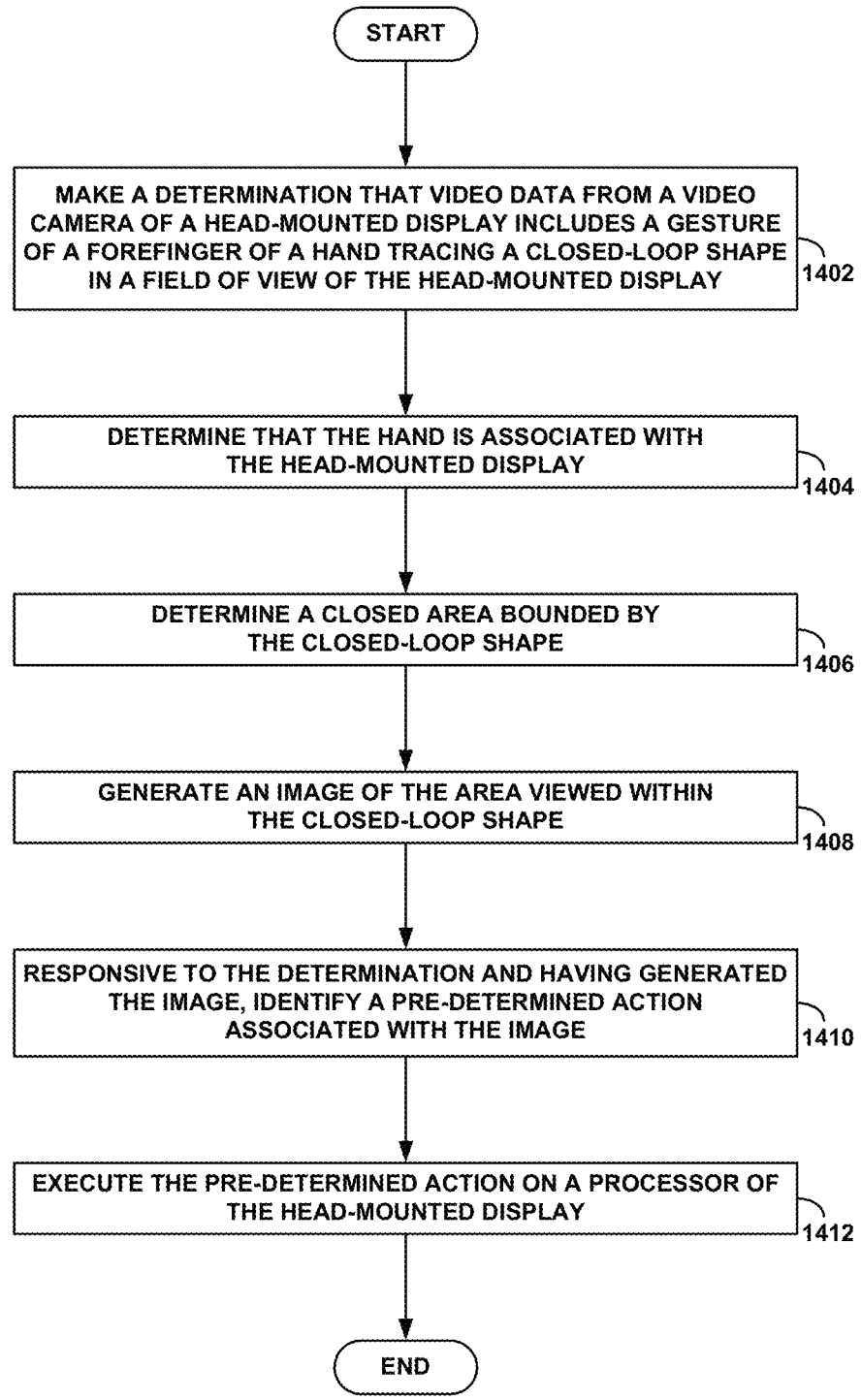
FIG. 14 is a flowchart illustrating an example embodiment of a closed-loop hand gesture method in a wearable computing device.

FIG. 14 is a flowchart illustrating an example embodiment of a method in a wearable computing system, such as a wearable HMD, for using a closed-loop-shaped hand gesture to convey user input.

As shown in FIG. 14, at step 1402 the wearable HMD makes a determination that video data from a video camera of the wearable HMD includes a hand gesture of a forefinger of a particular hand tracing a closed-loop shape in a FOV of the wearable HMD. As discussed above, an example of such a closed-loop hand gesture is illustrated in FIG. 11.

At step 1404, the wearable HMD determines that the hand is associated with the wearable HMD. As with the step 1204 of the example method of FIG. 12 and step 1304 of FIG. 13, the wearable HMD may analyze the video data that includes the hand gesture in order to determine that the hand is associated with the wearable HMD. For example, the wearable HMD could determine that one or more properties and/or characteristic of the hand satisfies one or more criteria for identifying the hand as that of a user or wearer of the wearable HMD.

Next, at step 1406 the wearable HMD determines a closed area in the FOV bounded by a closed loop. Again, this is illustrated in FIG. 11, which depicts the closed area as the dotted ellipse 1104. As with the area bounded by the heart-shaped gesture in the example of FIG. 12, the closed-loop-shaped gesture might not necessarily appear to form a strictly closed boundary. However, the closed-loop-shaped hand gesture could still be considered as effectively bounded, for example by extrapolating any small gap or opening in an otherwise nearly-closed boundary formed the motion of a hand.

At step 1408, the wearable HMD generates an image from the video data of a sub-FOV within the closed area determined at step 1406. As with the step 1206 of the example method of FIG. 12 and step 1308 of FIG. 13, the image may be generated, for example, by determining pixels of the video camera that correspond to the bounded area the closed area, and then capturing the image data from those pixels. Referring again to FIG. 11, an example is illustrated by the generated image 1106 corresponding to the bounded ellipse 1104 in the figure.

Next, at step 1410 the shape of a closed loop is matched with a predetermined action associated with the image. As with the step 1208 of the example method of FIG. 12 and step 1310 of FIG. 13, the matching step identifies the predetermined action, which is then associated with the image by virtue of the image having been generated from the area bounded by the closed loop. For example, a closed loop can be used to distinguish the predetermined action from a list or table of other possible actions associated with other more particularly defined shapes (e.g. a symbolic heart or a rectangle). The same predetermined action could be associated with another image generated from another instance of forming a close-loop-shaped hand gesture.

Finally, at step 1412 the predetermined action is carried out by the wearable HMD. As with the step 1210 of the example method of FIG. 12 and step 1312 of FIG. 13, the predetermined action is executed by a processor of the wearable HMD. In doing so, the predetermined action is applied to the image generated from the area bounded by the closed-loop-shaped hand gesture. Again, the same predetermined action could be applied to another image generated from another instance of forming closed-loop-shaped hand gesture.

In accordance with the example embodiment, a determination that the particular hand is associated with the wearable HMD could be made by detecting a particular marking on the particular hand, and then matching the particular marking with a predetermined identifier associated with the wearable HMD, in a similar manner to that described above in connection with the heart-shaped hand gesture and the right-angle-shaped hand gesture. Also in similarity with the description above, the HMD could determine that a particular hand gesture made by the particular hand matches a predetermined identifying hand gesture associated with the wearable HMD.

Also in accordance with the example embodiment, the predetermined action could include storing the image in one or another form of memory of the wearable HMD. For example, a user of the wearable HMD could generate a photo album through repeatedly invoking the closed-loop-shaped hand gesture to create images from the FOV of the wearable HMD.

In accordance with the example embodiment, the predetermined action could include generating a message containing the image, and then transmitting the message to a network server in a network communicatively coupled with the wearable HMD. For example, as with the right-angle-shaped hand gesture, a user of the wearable HMD could generate and upload an image to a server using a closed-loop-shaped hand gesture.

In further accordance with the example embodiment, the generated message could include information associating an identified subscriber account in a social networking service. The generated message could then be transmitted to the social networking service. As described above by way of example, the message could be transmitted to a network address of a server or server system at which the networking service is hosted. Also as described above, the social networking service could post the image online in association with the identified subscriber's account, making it available for other subscribers to view, for example.

Assuming once more that the user or wearer of the wearable HMD is the identified subscriber, the closed-loop-shaped hand gesture can be used to nearly instantly generate, upload, and post a photographic image to a social networking service, wherein the image can be one or more subjects, items, or visually-identifiable topics in the FOV of the wearable HMD. In so doing, the wearable HMD can extend even further the means by which it enables the user or wearer the HMD to become a direct, real-time, experience-based origin or source of social networking information.

In further accordance with the example embodiment, the wearable HMD could receive a response from the social networking service containing a result (or information therefrom) of a network-based information search carried out based on the transmitted image. As described above, the social networking service could invoke a network-based information search in which the image is the subject or topic of the search. Upon receiving the response from the social networking service with the search result, the wearable HMD could then display some aspect of the result. The example described above involving discovery of a live music concert based on a network-based search of an image of a musician could also be applied to an image generated from a closed-loop-shaped hand gesture, as well.

Also in accordance with example embodiment, a log-in message with a log-in request to a social networking service could be transmitted by the wearable HMD as part of the communications between the HMD and the social networking service, also as described above. Again, a log-in request could be used to enable the wearable HMD to access to the identified subscriber's account, for example.

In accordance with the example embodiment, the predetermined action could also include generating a message containing both the image from the closed-loop-shaped hand gesture and a request for a network-based information search based on the image, and then transmitting the message to a network server in a network communicatively coupled with the wearable HMD. As described above in connection with the heart-shaped hand gesture and the right-angle-shaped hand gesture, the server could invoke such an explicitly-requested network-based information search based the image is the subject or topic of the search, and return the search results in a response to the wearable HMD. Again, upon receiving the response, the wearable HMD could then display some aspect of the result.

It will be appreciated that the steps shown in FIG. 14 are meant to illustrate operation of an example embodiment. As such, various steps could be altered or modified, the ordering of certain steps could be changed, and additional steps could be added, while still achieving the overall desired operation.

CONCLUSION

An illustrative embodiment has been described by way of example herein. Those skilled in the art will understand, however, that changes and modifications may be made to this embodiment without departing from the true scope and spirit of the elements, products, and methods to which the embodiment is directed, which is defined by the claims.

What is claimed:

1. In a wearable head-mounted display (HMD), a computer-implemented method comprising:
   making a determination that video data from a video camera of the wearable HMD includes a hand gesture forming an area bounded by two hands in a shape of a symbolic heart;
   determining that the two hands are associated with the wearable HMD via analysis of the video data including the hand gesture;
   generating an image from the video data, wherein the image includes the area bounded by the two hands;
   matching the shape of the symbolic heart with a predetermined action associated with the image; and
   executing the predetermined action on a processor of the wearable HMD.

2. The method of claim 1, wherein determining that the two hands are associated with the wearable HMD comprises:
   detecting a particular marking on at least one of the two hands; and
   matching the particular marking with a predetermined identifier associated with the wearable HMD.

3. The method of claim 1, wherein determining that the two hands are associated with the wearable HMD via analysis of the video data including the hand gesture comprises determining that a particular hand gesture made by at least one of the two hands matches a predetermined identifying hand gesture associated with the wearable HMD.

4. The method of claim 1, wherein generating the image from the video data comprises determining a set of image pixels contained within the area bounded by the two hands.

5. The method of claim 1, wherein executing the predetermined action comprises:
determining a qualitative ranking for the image based on the determination; and
storing a data structure containing information associating the image with the qualitative ranking.

6. The method of claim 1, wherein executing the predetermined action comprises:
generating a message containing the image and information indicative of a qualitative ranking of the image; and
transmitting the message to a network server in a network communicatively coupled with the wearable HMD.

7. The method of claim 6, wherein generating the message comprises including in the message information associating an identified subscriber account of a social networking service with an indication of the image being liked,
and wherein transmitting the message to the network server comprises transmitting the message to the social networking service.

8. The method of claim 7, further comprising:
responsive to transmitting the message to the social networking service, receiving a response message from the social networking service containing information indicative of a result of a network-based information search carried out based on the image and on the indication of the image being liked; and
displaying an aspect of the contained information.

9. The method of claim 7, further comprising transmitting a log-in message to the social networking service, the log-in message including a request to log in to the identified subscriber account.

10. The method of claim 1, wherein executing the predetermined action comprises:
generating a message containing the image and a request for a network-based information search based on the image; and
transmitting the message to a network server in a network communicatively coupled with the wearable HMD.

11. The method of claim 10, further comprising:
receiving a response message from the network server containing information indicative of a search result; and
displaying an aspect of the contained information.

12. In a wearable head-mounted display (HMD), a computer-implemented method comprising:
making a determination that video data from a video camera of the wearable HMD includes a hand gesture of a thumb and forefinger of a particular hand forming a shape of a symbolic right angle moving from a first location to a second location in a field of view (FOV) of the wearable HMD;
determining that the particular hand is associated with the wearable HMD via analysis of the video data including the hand gesture;
determining a closed area in the FOV bounded by a rectangle having a first corner at a vertex of the symbolic right angle at the first location and a diagonally-opposite second corner at a vertex of the symbolic right angle at the second location;
generating an image from the video data of a sub-FOV within the closed area;
matching the shape of the symbolic right angle with a predetermined action associated with the image; and
executing the predetermined action on a processor of the wearable HMD.

13. The method of claim 12, wherein determining that the particular hand is associated with the wearable HMD comprises:
detecting a particular marking on the particular hand; and
matching the particular marking with a predetermined identifier associated with the wearable HMD.

14. The method of claim 12, wherein determining that the particular hand is associated with the wearable HMD via analysis of the video data including the hand gesture comprises determining that a particular hand gesture made by the particular hand matches a predetermined identifying hand gesture associated with the wearable HMD.

15. The method of claim 12, wherein generating the image from the video data of the sub-FOV within the closed area comprises determining a set of image pixels contained within the closed area.

16. The method of claim 12, wherein executing the predetermined action comprises storing the image.

17. The method of claim 12, wherein executing the predetermined action comprises:
generating a message containing the image; and
transmitting the message to a network server in a network communicatively coupled with the wearable HMD.

18. The method of claim 17, wherein generating the message comprises including in the message information associating an identified subscriber account of a social networking service with a request to post the image on a web page associated with the identified subscriber account,
and wherein transmitting the message to the network server comprises transmitting the message to the social network service.

19. The method of claim 18, further comprising:
responsive to transmitting the message to the social networking service, receiving a response message from the social networking service containing information indicative of a result of a network-based information search carried out based on the image; and
displaying an aspect of the contained information.

20. The method of claim 18, further comprising transmitting a log-in message to the social networking service, the log-in message including a request to log in to the identified subscriber account.

21. The method of claim 12, wherein executing the predetermined action comprises:
generating a message containing the image and a request for a network-based information search based on the image; and
transmitting the message to a network server in a network communicatively coupled with the wearable HMD.

22. The method of claim 21, further comprising:
receiving a response message from the network server containing information indicative of a search result; and
displaying an aspect of the contained information.

23. In a wearable head-mounted display (HMD), a computer-implemented method comprising:
making a determination that video data from a video camera of the wearable HMD includes a hand gesture of a forefinger of a particular hand tracing a closed-loop shape in a field of view (FOV) of the wearable HMD;

determining that the particular hand is associated with the wearable HMD via analysis of the video data including the hand gesture;
determining a closed area in the FOV bounded by the closed-loop shape;
generating an image from the video data of a sub-FOV within the closed area;
responsive to both making the determination and generating the image, identifying a predetermined action associated with the image; and
executing the predetermined action on a processor of the wearable HMD.

24. The method of claim 23, wherein determining that the particular hand is associated with the wearable HMD comprises:
detecting a particular marking on the particular hand; and
matching the particular marking with a predetermined identifier associated with the wearable HMD.

25. The method of claim 23, wherein determining that the particular hand is associated with the wearable HMD via analysis of the video data including the hand gesture comprises determining that a particular hand gesture made by the particular hand matches a predetermined identifying hand gesture associated with the wearable HMD.

26. The method of claim 23, wherein generating the image from the video data of the sub-FOV within the closed area comprises determining a set of image pixels contained within the closed area.

27. The method of claim 23, wherein executing the predetermined action comprises storing the image.

28. The method of claim 23, wherein executing the predetermined action comprises:
generating a message containing the image; and
transmitting the message to a network server in a network communicatively coupled with the wearable HMD.

29. The method of claim 28, wherein generating the message comprises including in the message information associating an identified subscriber account of a social networking service with a request to post the image on a web page associated with the identified subscriber account,
and wherein transmitting the message to the network server comprises transmitting the message to the social networking service.

30. The method of claim 29, further comprising:
responsive to transmitting the message to the social networking service, receiving a response message from the social networking service containing information indicative of a result of a network-based information search carried out based on the image; and
displaying an aspect of the contained information.

31. The method of claim 29, further comprising transmitting a log-in message to the social networking service, the log-in message including a request to log in to the identified subscriber account.

32. The method of claim 23, wherein executing the predetermined action comprises:
generating a message containing the image and a request for a network-based information search based on the image; and
transmitting the message to a network server in a network communicatively coupled with the wearable HMD.

33. The method of claim 32, further comprising:
receiving a response message from the network server containing information indicative of a search result; and
displaying an aspect of the contained information.

34. A wearable head-mounted display (HMD) comprising:
a display device;
a video camera;
one or more processors;
memory; and
machine-readable instructions stored in the memory that, when executed by the one or more processors, cause the wearable HMD to carry out functions including:
making a determination that video data from the video camera includes a hand gesture forming an area bounded by two hands in a shape of a symbolic heart,
determining that the two hands are associated with the wearable HMD via analysis of the video data including the hand gesture,
generating an image from the video data, wherein the image includes the area bounded by the two hands,
matching the shape of the symbolic heart with a predetermined action associated with the image,
and executing the predetermined action on a processor of the wearable HMD.

35. A nontransitory computer-readable medium having instructions stored thereon that, upon execution by one or more processors of a wearable head-mounted display (HMD), cause the wearable HMD to carry out functions comprising:
making a determination that video data from a video camera of the wearable HMD includes a hand gesture forming an area bounded by two hands in a shape of a symbolic heart;
determining that the two hands are associated with the wearable HMD via analysis of the video data including the hand gesture;
generating an image from the video data, wherein the image includes the area bounded by the two hands;
matching the shape of the symbolic heart with a predetermined action associated with the image; and
executing the predetermined action on a processor of the wearable HMD.

36. A wearable head-mounted display (HMD) comprising:
a display device;
a video camera;
one or more processors;
memory; and
machine-readable instructions stored in the memory that, when executed by the one or more processors, cause the wearable HMD to carry out functions including:
making a determination that video data from the video camera includes a hand gesture of a thumb and forefinger of a particular hand forming a shape of a symbolic right angle moving from a first location to a second location in a field of view (FOV) of the wearable HMD,
determining that the particular hand is associated with the wearable HMD via analysis of the video data including the hand gesture,
determining a closed area in the FOV bounded by a rectangle having a first corner at a vertex of the symbolic right angle at the first location and a diagonally-opposite second corner at a vertex of the symbolic right angle at the second location,
generating an image from the video data of a sub-FOV within the closed area,
matching the shape of the symbolic right angle with a predetermined action associated with the image,
and executing the predetermined action on a processor of the wearable HMD.

37. A nontransitory computer-readable medium having instructions stored thereon that, upon execution by one or more processors of a wearable head-mounted display (HMD), cause the wearable HMD to carry out functions comprising:

making a determination that video data from a video camera of the wearable HMD includes a hand gesture of a thumb and forefinger of a particular hand forming a shape of a symbolic right angle moving from a first location to a second location in a field of view (FOV) of the wearable HMD;

determining that the particular hand is associated with the wearable HMD via analysis of the video data including the hand gesture;

determining a closed area in the FOV bounded by a rectangle having a first corner at a vertex of the symbolic right angle at the first location and a diagonally-opposite second corner at a vertex of the symbolic right angle at the second location;

generating an image from the video data of a sub-FOV within the closed area;

matching the shape of the symbolic right angle with a predetermined action associated with the image; and executing the predetermined action on a processor of the wearable HMD.

38. A wearable head-mounted display (HMD) comprising:

a display device;

a video camera;

one or more processors;

memory; and machine-readable instructions stored in the memory that, when executed by the one or more processors, cause the wearable HMD to carry out functions including:

making a determination that video data from the video camera includes a hand gesture of a forefinger of a particular hand tracing a closed-loop shape in a field of view (FOV) of the wearable HMD, determining that the particular hand is associated with the wearable HMD via analysis of the video data including the hand gesture, determining a closed area in the FOV bounded by the closed-loop shape, generating an image from the video data of a sub-FOV within the closed area, responsive to both making the determination and generating the image, identifying a predetermined action associated with the image, and executing the predetermined action on a processor of the wearable HMD.

39. A nontransitory computer-readable medium having instructions stored thereon that, upon execution by one or more processors of a wearable head-mounted display (HMD), cause the wearable HMD to carry out functions comprising:

making a determination that video data from a video camera of the wearable HMD includes a hand gesture of a forefinger of a particular hand tracing a closed-loop shape in a field of view (FOV) of the wearable HMD;

determining that the particular hand is associated with the wearable HMD via analysis of the video data including the hand gesture;

determining a closed area in the FOV bounded by the closed-loop shape;

generating an image from the video data of a sub-FOV within the closed area;

responsive to both making the determination and generating the image, identifying a predetermined action associated with the image; and executing the predetermined action on a processor of the wearable HMD.

\* \* \* \* \*